(12) United States Patent  (10) Patent No.: US 9,197,916 B2
Thomas et al.  (45) Date of Patent: Nov. 24, 2015

(54) SYSTEMS AND METHODS FOR COMMUNICATING AND ENFORCING VIEWING AND RECORDING LIMITS FOR MEDIA-ON-DEMAND

(75) Inventors: William L. Thomas, Malvern, PA (US); Michael D. Ellis, Boulder, CO (US); Joseph P. Baumgartner, Tulsa, OK (US)

(73) Assignee: Rovi Guides, Inc., Santa Clara, CA (US)

(*) Notice: Subject to any disclaimer, the term of this patent is extended or adjusted under 35 U.S.C. 154(b) by 948 days.

(21) Appl. No.: 12/880,741

(22) Filed: Sep. 13, 2010

(65) Prior Publication Data

US 2011/0126246 A1 May 26, 2011

Related U.S. Application Data

(63) Continuation of application No. 09/974,495, filed on Oct. 9, 2001, now abandoned.

(60) Provisional application No. 60/239,607, filed on Oct. 11, 2000, provisional application No. 60/252,171, filed on Nov. 20, 2000, provisional application No. 60/270,351, filed on Feb. 21, 2001.

(51) Int. Cl.
*H04N 7/173* (2011.01)
*H04N 21/2743* (2011.01)
(Continued)

(52) U.S. Cl.
CPC .......... *H04N 21/2743* (2013.01); *G06F 3/0481* (2013.01); *H04N 5/445* (2013.01); *H04N 5/44582* (2013.01); *H04N 5/76* (2013.01); *H04N 7/17318* (2013.01); *H04N 7/17336* (2013.01); *H04N 21/2187* (2013.01);
(Continued)

(58) Field of Classification Search
USPC .................................................. 725/86–103
See application file for complete search history.

(56) References Cited

U.S. PATENT DOCUMENTS 3,594,778 A 7/1971 Herald et al.
4,338,644 A 7/1982 Staar
(Continued)

FOREIGN PATENT DOCUMENTS

CN 247388 10/1994
DE 2918846 11/1980
(Continued)

OTHER PUBLICATIONS

"Addressable Converters: A New Development at CableData," Via Cable, vol. 1, No. 12 (Dec. 1981).
(Continued)

*Primary Examiner* — Nasser Goodarzi
*Assistant Examiner* — Fred Peng
(74) *Attorney, Agent, or Firm* — Ropes & Gray LLP

(57) ABSTRACT

Systems and methods for communicating and enforcing viewing and recording limits for media-on-demand are provided. The system may provide a guidance application that allows users to select on-demand media offerings. The delivery of the on-demand media offerings may be managed based on the length of program, the bandwidth required, the available bandwidth, the time of delivery, pricing and other factors. The system may manage the delivery of on-demand offerings by assigning a number of different types of viewing rights to a user when an on-demand offering is selected. The system may warn a user of insufficient rights and enforce selected viewing rights.

20 Claims, 19 Drawing Sheets

(51) Int. Cl.

| | |
|---|---|
| *G06F 3/0481* | (2013.01) |
| *H04N 5/445* | (2011.01) |
| *H04N 5/76* | (2006.01) |
| *H04N 21/2187* | (2011.01) |
| *H04N 21/258* | (2011.01) |
| *H04N 21/262* | (2011.01) |
| *H04N 21/2747* | (2011.01) |
| *H04N 21/278* | (2011.01) |
| *H04N 21/422* | (2011.01) |
| *H04N 21/431* | (2011.01) |
| *H04N 21/441* | (2011.01) |
| *H04N 21/47* | (2011.01) |
| *H04N 21/472* | (2011.01) |
| *H04N 21/475* | (2011.01) |
| *H04N 21/6587* | (2011.01) |
| *H04N 21/482* | (2011.01) |
| *H04N 5/44* | (2011.01) |
| *H04N 5/775* | (2006.01) |
| *H04N 5/781* | (2006.01) |
| *H04N 5/85* | (2006.01) |
| *H04N 9/804* | (2006.01) |

(52) U.S. Cl.
CPC .. *H04N 21/25825* (2013.01); *H04N 21/25875* (2013.01); *H04N 21/25891* (2013.01); *H04N 21/26283* (2013.01); *H04N 21/278* (2013.01); *H04N 21/2747* (2013.01); *H04N 21/42204* (2013.01); *H04N 21/4316* (2013.01); *H04N 21/441* (2013.01); *H04N 21/47* (2013.01); *H04N 21/4751* (2013.01); *H04N 21/4753* (2013.01); *H04N 21/4755* (2013.01); *H04N 21/47202* (2013.01); *H04N 21/482* (2013.01); *H04N 21/6587* (2013.01); *H04N 5/4401* (2013.01); *H04N 5/775* (2013.01); *H04N 5/781* (2013.01); *H04N 5/85* (2013.01); *H04N 9/8042* (2013.01)

(56) References Cited

U.S. PATENT DOCUMENTS

| | | |
|---|---|---|
| 4,339,798 A | 7/1982 | Hedges et al. |
| 4,355,415 A | 10/1982 | George et al. |
| 4,422,105 A | 12/1983 | Rodesch et al. |
| 4,425,579 A | 1/1984 | Merrell |
| 4,429,385 A | 1/1984 | Cichelli et al. |
| 4,488,179 A | 12/1984 | Kruger et al. |
| 4,495,654 A | 1/1985 | Deiss |
| 4,496,171 A | 1/1985 | Cherry |
| 4,573,072 A | 2/1986 | Freeman |
| 4,602,279 A | 7/1986 | Freeman |
| 4,620,229 A | 10/1986 | Amano et al. |
| 4,641,205 A | 2/1987 | Beyers, Jr. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,718,107 A | 1/1988 | Hayes |
| 4,739,406 A | 4/1988 | Morton et al. |
| 4,745,549 A | 5/1988 | Hashimoto |
| 4,751,578 A | 6/1988 | Reiter et al. |
| 4,787,063 A | 11/1988 | Muguet et al. |
| 4,789,962 A | 12/1988 | Berry et al. |
| 4,807,052 A | 2/1989 | Amano et al. |
| 4,812,940 A | 3/1989 | Takenaga |
| 4,847,696 A | 7/1989 | Matsumoto et al. |
| 4,847,698 A | 7/1989 | Freeman |
| 4,847,700 A | 7/1989 | Freeman |
| 4,855,833 A | 8/1989 | Kageyama et al. |
| 4,857,999 A | 8/1989 | Welsh |
| 4,873,584 A | 10/1989 | Hashimoto et al. |
| 4,879,611 A | 11/1989 | Fukui et al. |
| 4,885,775 A | 12/1989 | Lucas |
| 4,894,789 A | 1/1990 | Yee |
| 4,908,707 A | 3/1990 | Kinghorn |
| 4,908,713 A | 3/1990 | Levine |
| 4,930,158 A | 5/1990 | Vogel |
| 4,945,563 A | 7/1990 | Horton et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,989,104 A | 1/1991 | Schulein et al. |
| 5,027,400 A | 6/1991 | Baji et al. |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,109,414 A | 4/1992 | Harvey et al. |
| 5,134,719 A | 7/1992 | Mankovitz |
| 5,151,789 A | 9/1992 | Young |
| 5,155,591 A | 10/1992 | Wachob |
| 5,172,111 A | 12/1992 | Olivo, Jr. |
| 5,172,413 A | 12/1992 | Bradley et al. |
| 5,187,589 A | 2/1993 | Kono et al. |
| 5,195,134 A | 3/1993 | Inoue et al. |
| 5,200,822 A | 4/1993 | Bronfin et al. |
| 5,210,611 A | 5/1993 | Yee et al. |
| 5,223,924 A | 6/1993 | Strubbe |
| 5,231,493 A | 7/1993 | Apitz et al. |
| RE34,340 E | 8/1993 | Freeman |
| 5,233,654 A | 8/1993 | Harvey et al. |
| 5,241,428 A | 8/1993 | Goldwasser et al. |
| 5,249,043 A | 9/1993 | Grandmougin et al. |
| 5,253,066 A | 10/1993 | Vogel |
| 5,285,284 A | 2/1994 | Takashima et al. |
| 5,293,357 A | 3/1994 | Hallenbeck |
| 5,296,931 A | 3/1994 | Na et al. |
| 5,299,006 A | 3/1994 | Kim et al. |
| 5,323,234 A | 6/1994 | Kawasaki et al. |
| 5,335,277 A | 8/1994 | Harvey et al. |
| 5,339,434 A | 8/1994 | Rusis |
| 5,341,350 A | 8/1994 | Frank et al. |
| 5,353,121 A | 10/1994 | Young et al. |
| 5,357,276 A | 10/1994 | Banker et al. |
| 5,371,551 A | 12/1994 | Logan et al. |
| 5,404,567 A | 4/1995 | DePietro et al. |
| 5,410,344 A | 4/1995 | Graves et al. |
| 5,412,720 A | 5/1995 | Hoarty |
| 5,416,508 A | 5/1995 | Sakuma et al. |
| 5,426,699 A | 6/1995 | Wunderlich et al. |
| 5,442,389 A | 8/1995 | Blahut et al. |
| 5,459,522 A | 10/1995 | Pint |
| 5,461,415 A | 10/1995 | Wolf et al. |
| 5,465,385 A | 11/1995 | Ohga et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo et al. |
| 5,502,504 A | 3/1996 | Marshall et al. |
| 5,508,815 A | 4/1996 | Levine |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |

(56) References Cited

U.S. PATENT DOCUMENTS

| | | | |
|---|---|---|---|
| 5,557,338 | A | 9/1996 | Maze et al. |
| 5,559,548 | A | 9/1996 | Davis et al. |
| 5,559,549 | A | 9/1996 | Hendricks et al. |
| 5,568,272 | A | 10/1996 | Levine |
| 5,574,778 | A | 11/1996 | Ely et al. |
| 5,576,755 | A | 11/1996 | Davis et al. |
| 5,583,560 | A | 12/1996 | Florin et al. |
| 5,583,561 | A | 12/1996 | Baker et al. |
| 5,583,563 | A | 12/1996 | Wanderscheid et al. |
| 5,583,653 | A | 12/1996 | Timmermans et al. |
| 5,585,838 | A | 12/1996 | Lawler et al. |
| 5,585,858 | A | 12/1996 | Harper et al. |
| 5,589,892 | A | 12/1996 | Knee et al. |
| 5,592,551 | A | 1/1997 | Lett et al. |
| 5,594,509 | A | 1/1997 | Florin et al. |
| 5,594,779 | A | 1/1997 | Goodman |
| 5,596,361 | A | 1/1997 | Martinez |
| 5,600,364 | A | 2/1997 | Hendricks et al. |
| 5,602,582 | A | 2/1997 | Wanderscheid et al. |
| 5,606,642 | A | 2/1997 | Stautner et al. |
| 5,616,876 | A | 4/1997 | Cluts |
| 5,619,247 | A | 4/1997 | Russo |
| 5,619,249 | A | 4/1997 | Billock et al. |
| 5,619,274 | A | 4/1997 | Roop et al. |
| 5,623,613 | A | 4/1997 | Rowe et al. |
| 5,625,678 | A | 4/1997 | Blomfield-Brown |
| 5,629,733 | A | 5/1997 | Youman et al. |
| 5,629,867 | A | 5/1997 | Goldman |
| 5,630,119 | A | 5/1997 | Aristides et al. |
| 5,631,995 | A | 5/1997 | Weissensteiner et al. |
| 5,632,007 | A | 5/1997 | Freeman |
| 5,635,978 | A | 6/1997 | Alten et al. |
| 5,635,987 | A | 6/1997 | Park et al. |
| 5,648,824 | A | 7/1997 | Dunn et al. |
| 5,652,613 | A | 7/1997 | Lazarus et al. |
| 5,654,748 | A | 8/1997 | Matthews, III |
| 5,654,886 | A | 8/1997 | Zereski, Jr. et al. |
| 5,657,072 | A | 8/1997 | Aristides et al. |
| 5,657,414 | A | 8/1997 | Lett et al. |
| 5,659,367 | A | 8/1997 | Yuen |
| 5,666,645 | A | 9/1997 | Thomas et al. |
| 5,675,743 | A | 10/1997 | Mavity |
| 5,684,525 | A | 11/1997 | Klosterman |
| 5,694,163 | A | 12/1997 | Harrison |
| 5,694,381 | A | 12/1997 | Sako et al. |
| 5,696,765 | A | 12/1997 | Safadi |
| 5,699,107 | A | 12/1997 | Lawler et al. |
| 5,708,961 | A | 1/1998 | Hylton et al. |
| 5,710,601 | A | 1/1998 | Marshall et al. |
| 5,717,452 | A | 2/1998 | Janin et al. |
| 5,721,829 | A | 2/1998 | Dunn et al. |
| 5,724,091 | A | 3/1998 | Freeman et al. |
| 5,727,060 | A | 3/1998 | Young |
| 5,732,216 | A | 3/1998 | Logan et al. |
| 5,734,119 | A | 3/1998 | France et al. |
| 5,734,719 | A | 3/1998 | Tsevdos et al. |
| 5,742,443 | A | 4/1998 | Tsao et al. |
| 5,745,710 | A | 4/1998 | Clanton, III et al. |
| 5,751,282 | A | 5/1998 | Girard et al. |
| 5,752,159 | A | 5/1998 | Faust et al. |
| 5,752,160 | A | 5/1998 | Dunn |
| 5,754,771 | A | 5/1998 | Epperson et al. |
| 5,758,257 | A | 5/1998 | Herz et al. |
| 5,758,258 | A | 5/1998 | Shoff et al. |
| 5,758,259 | A | 5/1998 | Lawler |
| 5,760,821 | A | 6/1998 | Ellis et al. |
| 5,768,528 | A | 6/1998 | Stumm |
| 5,771,435 | A | 6/1998 | Brown |
| 5,774,170 | A | 6/1998 | Hite et al. |
| 5,778,182 | A | 7/1998 | Cathey et al. |
| 5,778,187 | A | 7/1998 | Monteiro et al. |
| 5,781,226 | A | 7/1998 | Sheehan |
| 5,781,227 | A | 7/1998 | Goode et al. |
| 5,790,198 | A | 8/1998 | Roop et al. |
| 5,790,202 | A | 8/1998 | Kummer et al. |
| 5,790,423 | A | 8/1998 | Lau et al. |
| 5,793,412 | A | 8/1998 | Asamizuya |
| 5,793,971 | A | 8/1998 | Fujita et al. |
| 5,794,217 | A | 8/1998 | Allen |
| 5,796,952 | A | 8/1998 | Davis et al. |
| 5,801,787 | A | 9/1998 | Schein et al. |
| 5,802,284 | A | 9/1998 | Karlton et al. |
| 5,805,154 | A | 9/1998 | Brown |
| 5,805,763 | A | 9/1998 | Lawler et al. |
| 5,805,804 | A | 9/1998 | Laursen et al. |
| 5,805,806 | A | 9/1998 | McArthur |
| 5,808,608 | A | 9/1998 | Young et al. |
| 5,808,694 | A | 9/1998 | Usui et al. |
| 5,809,204 | A | 9/1998 | Young et al. |
| 5,809,246 | A | 9/1998 | Goldman |
| 5,812,123 | A | 9/1998 | Rowe et al. |
| 5,812,205 | A | 9/1998 | Milnes et al. |
| 5,812,937 | A | 9/1998 | Takahisa et al. |
| 5,815,146 | A | 9/1998 | Youden et al. |
| 5,818,438 | A | 10/1998 | Howe et al. |
| 5,819,019 | A | 10/1998 | Nelson |
| 5,819,156 | A | 10/1998 | Belmont |
| 5,819,160 | A | 10/1998 | Foladare et al. |
| 5,822,530 | A | 10/1998 | Brown |
| 5,828,945 | A | 10/1998 | Klosterman |
| RE35,954 | E | 11/1998 | Levine |
| 5,838,314 | A | 11/1998 | Neel et al. |
| 5,841,979 | A | 11/1998 | Schulhof et al. |
| 5,844,620 | A | 12/1998 | Coleman et al. |
| 5,850,218 | A | 12/1998 | LaJoie et al. |
| 5,859,641 | A | 1/1999 | Cave |
| 5,861,906 | A | 1/1999 | Dunn et al. |
| 5,867,483 | A | 2/1999 | Ennis, Jr. et al. |
| 5,880,768 | A | 3/1999 | Lemmons et al. |
| 5,881,245 | A | 3/1999 | Thompson |
| 5,884,028 | A | 3/1999 | Kindell et al. |
| 5,886,707 | A | 3/1999 | Berg |
| 5,886,732 | A | 3/1999 | Humpleman |
| 5,887,243 | A | 3/1999 | Harvey et al. |
| 5,892,915 | A | 4/1999 | Duso et al. |
| 5,894,589 | A | 4/1999 | Reber et al. |
| 5,896,414 | A | 4/1999 | Meyer et al. |
| 5,898,441 | A | 4/1999 | Flurry |
| 5,898,456 | A | 4/1999 | Wahl |
| 5,899,582 | A | 5/1999 | DuLac |
| 5,900,904 | A | 5/1999 | Okada et al. |
| 5,903,234 | A | 5/1999 | Kimura |
| 5,903,263 | A | 5/1999 | Emura |
| 5,903,264 | A | 5/1999 | Moeller et al. |
| 5,905,522 | A | 5/1999 | Lawler |
| 5,905,847 | A | 5/1999 | Kobayashi et al. |
| 5,909,638 | A | 6/1999 | Allen |
| 5,911,046 | A | 6/1999 | Amano |
| 5,913,039 | A | 6/1999 | Nakamura et al. |
| 5,914,941 | A | 6/1999 | Janky |
| 5,915,090 | A | 6/1999 | Joseph et al. |
| 5,915,094 | A | 6/1999 | Kouloheris et al. |
| 5,916,303 | A | 6/1999 | Scott |
| 5,917,538 | A | 6/1999 | Asamizuya |
| 5,917,835 | A | 6/1999 | Barrett et al. |
| 5,920,702 | A | 7/1999 | Bleidt et al. |
| 5,920,800 | A | 7/1999 | Schafer |
| 5,922,045 | A | 7/1999 | Hanson |
| 5,922,048 | A | 7/1999 | Emura |
| 5,923,361 | A | 7/1999 | Sutton, Jr. |
| 5,926,204 | A | 7/1999 | Mayer |
| 5,926,205 | A | 7/1999 | Krause et al. |
| 5,926,624 | A | 7/1999 | Katz et al. |
| 5,928,327 | A | 7/1999 | Wang et al. |
| 5,929,850 | A | 7/1999 | Broadwin et al. |
| 5,930,473 | A | 7/1999 | Teng et al. |
| 5,930,493 | A | 7/1999 | Ottesen et al. |
| 5,931,901 | A | 8/1999 | Wolfe et al. |
| 5,933,603 | A | 8/1999 | Vahalia et al. |
| 5,933,835 | A | 8/1999 | Adams et al. |
| 5,935,206 | A | 8/1999 | Dixon et al. |
| 5,936,569 | A | 8/1999 | Ståhle et al. |
| 5,940,071 | A | 8/1999 | Treffers et al. |
| 5,940,073 | A | 8/1999 | Klosterman et al. |

(56) References Cited

U.S. PATENT DOCUMENTS

| | | |
|---|---|---|
| 5,940,572 A | 8/1999 | Balaban et al. |
| 5,943,046 A | 8/1999 | Cave et al. |
| 5,943,047 A | 8/1999 | Suzuki |
| 5,945,987 A | 8/1999 | Dunn |
| 5,947,746 A | 9/1999 | Tsai |
| 5,949,411 A | 9/1999 | Doerr et al. |
| 5,949,954 A | 9/1999 | Young et al. |
| 5,956,482 A | 9/1999 | Agraharam et al. |
| 5,959,592 A | 9/1999 | Petruzzelli |
| 5,959,659 A | 9/1999 | Dokic |
| 5,963,202 A | 10/1999 | Polish |
| 5,963,264 A | 10/1999 | Jackson |
| 5,964,455 A | 10/1999 | Catanzarite et al. |
| 5,969,714 A | 10/1999 | Butcher |
| 5,969,748 A | 10/1999 | Casement et al. |
| 5,973,680 A | 10/1999 | Ueda |
| 5,973,722 A | 10/1999 | Wakai et al. |
| 5,974,217 A | 10/1999 | Haraguchi |
| 5,974,222 A | 10/1999 | Yuen et al. |
| 5,977,963 A | 11/1999 | Gaughan et al. |
| 5,977,964 A | 11/1999 | Williams et al. |
| 5,978,567 A | 11/1999 | Rebane et al. |
| 5,978,843 A | 11/1999 | Wu et al. |
| 5,986,650 A | 11/1999 | Ellis et al. |
| 5,987,213 A | 11/1999 | Mankovitz et al. |
| 5,990,881 A | 11/1999 | Inoue et al. |
| 5,995,155 A | 11/1999 | Schindler et al. |
| 5,999,970 A | 12/1999 | Krisbergh et al. |
| 6,002,394 A | 12/1999 | Schein et al. |
| 6,002,720 A | 12/1999 | Yurt et al. |
| 6,005,564 A | 12/1999 | Ahmad et al. |
| 6,005,600 A | 12/1999 | Hill |
| 6,009,465 A | 12/1999 | Decker et al. |
| 6,012,089 A | 1/2000 | Hasegawa |
| 6,012,091 A | 1/2000 | Boyce |
| 6,014,184 A | 1/2000 | Knee et al. |
| 6,014,381 A | 1/2000 | Troxel et al. |
| 6,014,693 A | 1/2000 | Ito et al. |
| 6,014,694 A | 1/2000 | Aharoni et al. |
| 6,014,706 A | 1/2000 | Cannon et al. |
| 6,018,359 A | 1/2000 | Kermode et al. |
| 6,018,765 A | 1/2000 | Durana et al. |
| 6,020,912 A | 2/2000 | De Lang |
| 6,022,223 A | 2/2000 | Taniguchi et al. |
| 6,023,725 A | 2/2000 | Ozawa et al. |
| 6,025,868 A | 2/2000 | Russo |
| 6,028,600 A | 2/2000 | Rosin et al. |
| 6,029,064 A | 2/2000 | Farris et al. |
| 6,038,367 A | 3/2000 | Abecassis |
| 6,038,591 A | 3/2000 | Wolfe et al. |
| 6,052,145 A | 4/2000 | Macrae et al. |
| 6,057,890 A | 5/2000 | Virden et al. |
| 6,058,242 A | 5/2000 | Kim |
| 6,081,291 A | 6/2000 | Ludwig, Jr. |
| 6,091,883 A | 7/2000 | Artigalas et al. |
| 6,091,884 A | 7/2000 | Yuen et al. |
| RE36,801 E | 8/2000 | Logan et al. |
| 6,133,910 A | 10/2000 | Stinebruner |
| 6,141,488 A | 10/2000 | Knudson et al. |
| 6,154,771 A | 11/2000 | Rangan et al. |
| 6,157,377 A | 12/2000 | Shah-Nazaroff et al. |
| 6,157,413 A | 12/2000 | Hanafee et al. |
| 6,160,546 A | 12/2000 | Thompson et al. |
| 6,163,316 A | 12/2000 | Killian |
| 6,177,931 B1 | 1/2001 | Alexander et al. |
| 6,185,360 B1 | 2/2001 | Inoue et al. |
| 6,185,736 B1 | 2/2001 | Ueno |
| 6,208,335 B1 | 3/2001 | Gordon et al. |
| 6,208,799 B1 | 3/2001 | Marsh et al. |
| 6,233,389 B1 | 5/2001 | Barton et al. |
| 6,240,460 B1 | 5/2001 | Mitsutake et al. |
| 6,275,648 B1 | 8/2001 | Knudson et al. |
| 6,314,575 B1 | 11/2001 | Billock et al. |
| 6,323,911 B1 | 11/2001 | Schein et al. |
| 6,324,338 B1 | 11/2001 | Wood et al. |
| 6,327,418 B1 | 12/2001 | Barton |
| 6,348,932 B1 | 2/2002 | Nishikawa et al. |
| 6,388,714 B1 | 5/2002 | Schein et al. |
| 6,430,358 B1 | 8/2002 | Yuen et al. |
| 6,438,596 B1 | 8/2002 | Ueno et al. |
| 6,442,332 B1 | 8/2002 | Knudson et al. |
| 6,473,559 B1 | 10/2002 | Knudson et al. |
| 6,490,722 B1 | 12/2002 | Barton et al. |
| 6,505,348 B1 | 1/2003 | Knowles et al. |
| 6,553,376 B1 | 4/2003 | Lewis et al. |
| 6,564,005 B1 | 5/2003 | Berstis |
| 6,609,253 B1* | 8/2003 | Swix et al. ............... 725/88 |
| 6,611,958 B1 | 8/2003 | Shintani et al. |
| 6,681,396 B1 | 1/2004 | Bates et al. |
| 6,744,967 B2 | 6/2004 | Kaminski et al. |
| 6,757,907 B1 | 6/2004 | Schumacher et al. |
| 6,760,538 B1 | 7/2004 | Bumgardner et al. |
| 6,771,885 B1 | 8/2004 | Agnihotri et al. |
| 6,771,886 B1 | 8/2004 | Mendelsohn |
| 6,857,132 B1 | 2/2005 | Rakib et al. |
| 6,986,156 B1* | 1/2006 | Rodriguez et al. ............... 725/95 |
| 7,010,801 B1* | 3/2006 | Jerding et al. ............... 725/95 |
| 7,024,679 B1 | 4/2006 | Sie et al. |
| 7,088,910 B2 | 8/2006 | Potrebic et al. |
| 7,096,486 B1 | 8/2006 | Ukai et al. |
| 7,151,886 B2 | 12/2006 | Young et al. |
| 7,185,355 B1 | 2/2007 | Ellis et al. |
| 7,242,988 B1 | 7/2007 | Hoffberg et al. |
| 7,809,849 B2* | 10/2010 | Sie et al. ............... 709/231 |
| 7,937,734 B2* | 5/2011 | Haddad ............... 725/87 |
| 2001/0024470 A1 | 9/2001 | Radha et al. |
| 2001/0037508 A1 | 11/2001 | Hindus et al. |
| 2001/0046366 A1 | 11/2001 | Susskind |
| 2002/0057893 A1 | 5/2002 | Wood et al. |
| 2002/0059599 A1 | 5/2002 | Schein et al. |
| 2002/0081096 A1 | 6/2002 | Watanabe et al. |
| 2002/0144279 A1 | 10/2002 | Zhou |
| 2002/0174430 A1 | 11/2002 | Ellis et al. |
| 2002/0174433 A1 | 11/2002 | Baumgartner et al. |
| 2002/0191954 A1 | 12/2002 | Beach et al. |
| 2003/0009766 A1 | 1/2003 | Marolda |
| 2003/0061619 A1 | 3/2003 | Giammaressi |
| 2003/0093790 A1* | 5/2003 | Logan et al. ............... 725/38 |
| 2003/0126607 A1 | 7/2003 | Phillips et al. |
| 2003/0149988 A1 | 8/2003 | Ellis et al. |
| 2003/0198461 A1 | 10/2003 | Taylor et al. |
| 2003/0206719 A1 | 11/2003 | Bumgardner et al. |
| 2003/0210898 A1 | 11/2003 | Juen et al. |
| 2004/0013409 A1 | 1/2004 | Beach et al. |
| 2004/0103434 A1 | 5/2004 | Ellis |
| 2004/0148634 A1* | 7/2004 | Arsenault et al. ............... 725/89 |
| 2004/0181814 A1 | 9/2004 | Ellis et al. |
| 2005/0044571 A1 | 2/2005 | Jerding et al. |
| 2005/0060756 A1* | 3/2005 | Daniels ............... 725/134 |
| 2005/0071882 A1 | 3/2005 | Rodriguez et al. |
| 2005/0097619 A1 | 5/2005 | Haddad |
| 2005/0198677 A1 | 9/2005 | Lewis |
| 2005/0204388 A1 | 9/2005 | Knudson et al. |
| 2005/0240968 A1 | 10/2005 | Knudson et al. |
| 2005/0273819 A1 | 12/2005 | Knudson et al. |
| 2006/0064728 A1 | 3/2006 | Son et al. |
| 2006/0140584 A1 | 6/2006 | Ellis et al. |
| 2012/0155837 A1* | 6/2012 | Kahn et al. ............... 386/259 |

FOREIGN PATENT DOCUMENTS

| | | |
|---|---|---|
| DE | 3337204 | 4/1985 |
| DE | 3527939 | 2/1987 |
| DE | 3623924 | 2/1988 |
| DE | 3921847 | 1/1991 |
| DE | 4240187 | 6/1994 |
| EP | 0051228 | 5/1982 |
| EP | 0337336 | 10/1989 |
| EP | 0393955 A1 | 10/1990 |
| EP | 0424469 | 5/1991 |
| EP | 0444496 | 9/1991 |
| EP | 0447968 | 9/1991 |
| EP | 0488379 | 6/1992 |
| EP | 0535749 A2 | 4/1993 |

(56) References Cited

FOREIGN PATENT DOCUMENTS

| | | |
|---|---|---|
| EP | 0572090 A2 | 12/1993 |
| EP | 0624039 A2 | 11/1994 |
| EP | 0662771 A1 | 7/1995 |
| EP | 0682452 | 11/1995 |
| EP | 0711076 A2 | 5/1996 |
| EP | 0725539 A2 | 8/1996 |
| EP | 0758833 A2 | 2/1997 |
| EP | 0763938 | 3/1997 |
| EP | 0836320 | 4/1998 |
| EP | 0854645 A2 | 7/1998 |
| EP | 0874524 | 10/1998 |
| EP | 0924927 A2 | 6/1999 |
| EP | 0940983 | 9/1999 |
| EP | 0944253 A1 | 9/1999 |
| EP | 0986046 A1 | 3/2000 |
| GB | 222762 A | 10/1924 |
| GB | 222959 A | 10/1924 |
| GB | 1370535 | 10/1974 |
| GB | 2155713 | 9/1985 |
| GB | 2210526 A | 6/1989 |
| GB | 2217144 | 10/1989 |
| GB | 2256115 A | 11/1992 |
| GB | 2346251 | 8/2000 |
| JP | 61109379 A | 5/1986 |
| JP | 61227486 A | 10/1986 |
| JP | 62008389 A | 1/1987 |
| JP | 62066493 A | 3/1987 |
| JP | 62125077 A | 6/1987 |
| JP | 62198768 A | 9/1987 |
| JP | 6354884 | 3/1988 |
| JP | 63141467 A | 6/1988 |
| JP | 63247812 A | 10/1988 |
| JP | 63276069 A | 11/1988 |
| JP | 63299582 A | 12/1988 |
| JP | 1025740 A | 1/1989 |
| JP | 1078328 A | 3/1989 |
| JP | 1142918 A | 6/1989 |
| JP | 1150928 A | 6/1989 |
| JP | 1209399 A | 8/1989 |
| JP | 1212986 A | 8/1989 |
| JP | 1307944 A | 12/1989 |
| JP | 2113318 A | 4/1990 |
| JP | 2189753 A | 7/1990 |
| JP | 6061935 A | 3/1994 |
| JP | 6249528 A | 9/1994 |
| JP | 6260384 A | 9/1994 |
| JP | 813051 | 5/1996 |
| JP | 10247344 A | 9/1998 |
| JP | 2838892 | 10/1998 |
| JP | 2000224533 | 8/2000 |
| JP | 2000235546 | 8/2000 |
| JP | 2000306314 | 11/2000 |
| JP | 200013888 A | 7/2001 |
| JP | 200013708 A | 8/2001 |
| JP | 200116566 A | 8/2001 |
| JP | 20018837 A | 10/2001 |
| JP | 200116752 A | 8/2002 |
| JP | 200125795 A | 8/2002 |
| WO | WO-8700884 A1 | 2/1987 |
| WO | WO-8804507 A1 | 6/1988 |
| WO | WO-8903085 A1 | 4/1989 |
| WO | WO-8912370 A1 | 12/1989 |
| WO | WO-9000847 | 1/1990 |
| WO | WO-9100670 | 1/1991 |
| WO | WO-9107050 A1 | 5/1991 |
| WO | WO-9204801 A1 | 3/1992 |
| WO | WO-9222983 | 12/1992 |
| WO | WO-9308542 | 4/1993 |
| WO | WO-9322877 A2 | 11/1993 |
| WO | WO-9323957 A1 | 11/1993 |
| WO | WO-9501058 | 1/1995 |
| WO | WO-9515658 A1 | 6/1995 |
| WO | WO-9531069 | 11/1995 |
| WO | WO-9532583 A1 | 11/1995 |
| WO | WO-9532584 | 11/1995 |
| WO | WO-9532585 A1 | 11/1995 |
| WO | WO-9532587 | 11/1995 |
| WO | WO-9609721 A1 | 3/1996 |
| WO | WO-9617467 A2 | 6/1996 |
| WO | WO-9625821 | 8/1996 |
| WO | WO-9626605 A1 | 8/1996 |
| WO | WO-9633572 A1 | 10/1996 |
| WO | WO-9634467 A1 | 10/1996 |
| WO | WO-9636172 | 11/1996 |
| WO | WO-9637075 A1 | 11/1996 |
| WO | WO-9641472 | 12/1996 |
| WO | WO-9641478 A1 | 12/1996 |
| WO | WO-9713368 A1 | 4/1997 |
| WO | WO-9721291 A2 | 6/1997 |
| WO | WO-9732434 A1 | 9/1997 |
| WO | WO-9734413 A1 | 9/1997 |
| WO | WO-9734414 | 9/1997 |
| WO | WO-9737500 A1 | 10/1997 |
| WO | WO-9742763 A1 | 11/1997 |
| WO | WO-9746016 | 12/1997 |
| WO | WO-9746943 A1 | 12/1997 |
| WO | WO-9747124 A1 | 12/1997 |
| WO | WO-9748228 | 12/1997 |
| WO | WO-9748230 A1 | 12/1997 |
| WO | WO-9749237 A1 | 12/1997 |
| WO | WO-9801995 | 1/1998 |
| WO | WO-9806219 A1 | 2/1998 |
| WO | WO-9807277 | 2/1998 |
| WO | WO-9810589 A1 | 3/1998 |
| WO | WO-9812872 | 3/1998 |
| WO | WO-9817033 A1 | 4/1998 |
| WO | WO-9817064 A1 | 4/1998 |
| WO | WO-9818260 A1 | 4/1998 |
| WO | WO-9819459 A1 | 5/1998 |
| WO | WO-9826528 A2 | 6/1998 |
| WO | WO-9826584 | 6/1998 |
| WO | WO-9826596 | 6/1998 |
| WO | WO-9831115 A2 | 7/1998 |
| WO | WO-9831116 A2 | 7/1998 |
| WO | WO-9834405 A1 | 8/1998 |
| WO | WO-9838831 A1 | 9/1998 |
| WO | WO-9847279 A2 | 10/1998 |
| WO | WO-9848566 A2 | 10/1998 |
| WO | WO-9903267 A1 | 1/1999 |
| WO | WO-9904561 A1 | 1/1999 |
| WO | WO-9911060 A1 | 3/1999 |
| WO | WO-9912320 A1 | 3/1999 |
| WO | WO-9927681 A2 | 6/1999 |
| WO | WO-9928897 A1 | 6/1999 |
| WO | WO-9939466 A1 | 8/1999 |
| WO | WO-9945700 A1 | 9/1999 |
| WO | WO-9952279 A1 | 10/1999 |
| WO | WO-9956473 A1 | 11/1999 |
| WO | WO-9960790 A1 | 11/1999 |
| WO | WO-9965244 A1 | 12/1999 |
| WO | WO-9966725 A1 | 12/1999 |
| WO | WO-0004706 A2 | 1/2000 |
| WO | WO-0005885 A1 | 2/2000 |
| WO | WO-0007368 A1 | 2/2000 |
| WO | WO-0008850 A1 | 2/2000 |
| WO | WO-0008851 A1 | 2/2000 |
| WO | WO-0008852 A1 | 2/2000 |
| WO | WO-0011869 A1 | 3/2000 |
| WO | WO-0016548 A1 | 3/2000 |
| WO | WO-0028739 A1 | 5/2000 |
| WO | WO-0033560 A2 | 6/2000 |
| WO | WO-0058833 | 10/2000 |
| WO | WO-0058967 A1 | 10/2000 |
| WO | WO-0059214 | 10/2000 |
| WO | WO-0059223 A1 | 10/2000 |
| WO | WO-0062298 A1 | 10/2000 |
| WO | WO-0062299 A1 | 10/2000 |
| WO | WO-0062533 A1 | 10/2000 |
| WO | WO-0067475 A1 | 11/2000 |
| WO | WO-0101677 A1 | 1/2001 |
| WO | WO-0101689 A1 | 1/2001 |
| WO | WO-0122729 A1 | 3/2001 |
| WO | WO-0135662 A1 | 5/2001 |
| WO | WO-0146843 A2 | 6/2001 |

(56) References Cited

FOREIGN PATENT DOCUMENTS

| | | |
|---|---|---|
| WO | WO-0147238 A2 | 6/2001 |
| WO | WO-0147257 A1 | 6/2001 |
| WO | WO-0147273 A1 | 6/2001 |
| WO | WO-0147279 A2 | 6/2001 |
| WO | WO-0150743 | 7/2001 |
| WO | WO-0176239 A2 | 10/2001 |
| WO | WO-0176248 A2 | 10/2001 |
| WO | WO-02078317 A2 | 10/2002 |

OTHER PUBLICATIONS

"Electronic Programme Guide (EPG); Protocol for a TV Guide using electronic data transmission" by European Telecommunication Standards Institute, May 1997, Valbonne, France, publication No. ETS 300 707.
Advanced Analog Systems—Addressable Terminals, General Instrument Corp. of Horsham, Pennsylvania, (http//www.gi.com/BUSAREA/ANALOG/TERMINAL/WATCH/watch.html), printed from the internet on Mar. 4, 1999.
Article: "Windows 98 Feature Combines TV, Terminal and the Internet", New York Times, Aug. 18, 1998.
Brugliera, "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
CableData brochure, "A New Approach to Addressability" (undated).
Chang, Y. et al., "An Open-Systems Approach to Video on Demand," IEEE Communications Magazine, vol. 32, No. 5 pp. 68-80 (May 1994).
David M. Rudnick, U.S. Appl. No. 09/283,681, filed Apr. 1, 1999, entitled "Interactive Television Program Guide System Having Graphic Arrangements of Program Event Regions".
DirecTV Digital Satellite Receiver—Operating Instructions, Sony Electronics Inc. (2001).
DirecTV Receiver—Owner's Manual, DirecTV, Inc. (2002).
DirecTV Receiver with TiVo Digital Satellite Receiver IRecorder Sat-T60 -Installation Guide Corporation (2000).
DirecTV Receiver with TiVo Installation Guide, Philips (2000).
DirecTV Receiver with TiVo Viewer's Guide (1999, 2000).
DishPro Satellite System—User's Guide, Dish Network (undated).
Edmonson et al., "NBC Switching Central," SMPTE Journal, Oct. 1976, vol. 85, No. 10, pp. 795-805.
Edwardson et al., "CEEFAX: A Proposed New Broadcasting Service," SMPTE Journal, Jan. 1974, vol. 83, pp. 14-19.
Fall 2001 TiVo Service Update with Dual Tuner!, TiVo Inc. (2001).
Hoffman et al., "Videotext Programmiert Videorecorder," Sep. 1982, 9 pages.
Hofmann, et al., "Videotext Programmiert Videorecorder," Rundfunktechnische Mitteilungen, Nov.-Dec. 1982, pp. 254-257 (translation abstract attached).
James, A., "Oracle-Broadcasting the Written Word," Wireless World, Jul. 1973.
Kruger, H. Eckart, "Digital Video Identification System VIS," German, 9 pages, 1982.
Miller, M.D., "A Scenario for the Deployment of Interactive Multimedia Cable Television Systems in the United States in the 1990's," Proceedings of the IEEE, vol. 82, No. 4, pp. 585-589 (Apr. 1994).
Office Action dated Dec. 26, 2007, U.S. Appl. No. 09/973,976.
Office Action dated May 18, 2006, U.S. Appl. No. 09/973,976.
Office Action dated May 4, 2007, U.S. Appl. No. 09/973,976.
Office Action dated Nov. 17, 2005, U.S. Appl. No. 09/973,976.
Office Action dated Oct. 1, 2008, U.S. Appl. No. 09/973,976.
Page 12 of Philips TV 21SL5756/00B User Manual; obtained Mar. 31, 2009.
Patent abstract for Japanese patent Publication No. JP 10 065978, Patent Abstracts of Japan, vol. 1998, No. 08, Jun. 3, 1998.
Patent abstract for Japanese patent Publication No. JP 11 205711, Patent Abstracts of Japan, vol. 1999, No. 12, Jul. 30, 1999.
Patent abstract for Japanese patent Publication No. JP 11 032272, Patent Abstracts of Japan, vol. 1999, No. 05, Feb. 2, 1999.
Philips Consumer Electronics, Users Manual, Matchline 28DC2070, 33DC2080; obtained Mar. 31, 2009.
Printed materials on "Time's Teletext Service," 1982-1983, pp. V79175, V79142, V79143, V79148, and V79151.
PTV Recorder Setup Guide, Philips (2000).
RCA Satellite Receiver User's Guide, Thomson Multimedia Inc. (2001).
Roizen, Joseph, Teletext in USA, Jul. 1981, pp. 602-610.
Sorce, J. et al., "Designing a Broadband Residential Entertainment Service: A Case Study," 13th International Symposium Human Factors in Telecommunications, Torino, Italy, Sep. 10-14, 1990 pp. 141-148.
Start Here, Sony, TiVo and DirecTV (undated).
Symposium Record Broadcast Sessions, 14th International TV Symposium, Montreux, Switzerland, Jun. 6-12, 1985, 9 pages.
System as described in Cable Data Advertisement "There's more to one-way addressability than meets the eye"; vol. 7, No. 30, Apr. 15, 1982.
Systems as described in Dip II Advertisement "Program Listings Never Looked So Good", English Translation of A. Bismuth, vol. 54, No. 3, pp. 46-50, Feb. 8, 2005.
The New York Times Website Article, "2 Makers Plan Introductions of Digital VCR", by John Markoff, Mar. 29, 1999.
TV Guide, San Francisco Metropolitan Schedule, Feb. 6, 1989.
User's Guide RCA Color TV with TV Plus + Guide, 1997.
Von Gerhard Eitz and Karl-Ulrich Oberlies, "Videotext Programmiert Videoheimgerate (VPV)," Sep. 1986, pp. 223-229; translation of abstract included.
Ziesel et al.; "An Interactive Menu-Driven Remote Control Unite for TV-Receivers and VC-Recorders," IEEE Transactions on Consumer Electronics, Aug. 1988, vol. 34, No. 3, pp. 814-818.

* cited by examiner

SYSTEMS AND METHODS FOR COMMUNICATING AND ENFORCING VIEWING AND RECORDING LIMITS FOR MEDIA-ON-DEMAND

This application is a continuation of U.S. patent application Ser. No. 09/974,495 filed Oct. 9, 2001, which claims the benefit of U.S. Provisional Patent Application Nos. 60/239,607, filed Oct. 11, 2000, 60/252,171, filed Nov. 20, 2000 and 60/270,351, filed Feb. 21, 2001, which are hereby incorporated by reference in their entirety.

BACKGROUND OF THE INVENTION

The present invention relates to systems and methods for media-on-demand. More particularly, the present invention relates to systems and methods for managing the availability of media-on-demand.

Since the inception of television, the number of television viewers has substantially increased to hundreds of millions of viewers in the United States and perhaps billions worldwide. These television viewers may typically have their own personal interests which may vary greatly from person to person. Broadcast television networks have sought to meet such viewer demands with specific programming shown at convenient viewing times. Cable, satellite, and broadcast television systems have tried to achieve the same goal by providing a large selection of television channels. Some known cable systems have provided services such as "pay-per-view" and "premium" channels to provide television viewers with greater programming variety and more control over their program viewing schedule. However, such known systems have been deficient in providing a sufficient number of programs that have sufficiently flexible broadcast times.

Video-on-demand systems have been developed that provide a large selection of programs with on-demand start times. However, these known systems have been deficient in appropriately managing the availability, the purchasing, the communications bandwidth, the duration, etc. of the programming.

SUMMARY OF THE INVENTION

In accordance with the principles of the present invention, systems or methods may be provided to suitably manage the delivery and distribution of on-demand media. A user, who selects a media item for on-demand delivery, may be assigned certain viewing rights in connection with the on-demand delivery of that media item. Alternatively, when selecting a media item, the user may be presented with different viewing rights to select from and may be informed of different pricing based on which one of the different rights are selected. There may be more than one type of viewing right so that different users may select to have different viewing rights for a particular item that is available for on-demand delivery. Viewing rights may include a particular viewing window, a particular streaming time limit, a particular playback time limit, and/or restrictions on the extent to which a user may access, control, record, or playback a media item.

A viewing window may limit users to on-demand access for a particular period of time (e.g., only for a particular period of time). The system may inform users of viewing rights (e.g., a viewing window) when a user is purchasing the media and/or when the media is being delivered to the user. A streaming time limit may limit the period of time during which system bandwidth can be used in connection with a selected on-demand media item (e.g. in connection with the delivery of the on-demand media item).

The system may monitor user progress to determine the current status of the user's viewing rights or to determine whether the user's rights have reached or are reaching their limit. The system may determine whether the user's rights have reached or are reaching their limits based on, for example, the length of media, the users' positions in the media, the maximum allowable streaming time, the viewing window, any other suitable parameter, or any suitable combination thereof.

The system may warn users as their rights are approaching the limits, and may provide users with the opportunity to extend the viewing rights.

The system may allow users to record the media being transmitted. Users may be allowed to select, purchase and record programs on local or remote storage. Some examples of such local devices are a local video cassette recorder, a local hard-disk, personal video recorder or other digital storage device. The media may also be stored on a remote server or other remote device.

An application for providing features for providing and managing on-demand media may be an interactive program guide. Illustrative interactive television program guides are described, for example, in Knee et al. U.S. Pat. No. 5,589,892 and Knudson et al. U.S. patent application Ser. No. 09/357,941, filed Jul. 6, 1999, which are hereby incorporated by reference in their entireties.

The guidance application may allow users to play the recorded media within a predefined time period. The system or guidance application may also limit the amount of playback time. The system or guidance application may provide a warning to the user that there is not enough viewing, or playback time to watch the remainder of a media-on-demand or recorded program.

The system or guidance application may, if desired, provide a visual indicator of the viewing limit, the elapsed time, how much time is needed to complete the program or any combination thereof. The system may provide the user with an opportunity to extend viewing rights for example by purchasing additional playback time.

The system may indicate to a user that stopping, pausing or rewinding a real-time or recorded program may cause the playback of the on-demand media to extend beyond a viewing or playback limit. For example, a user may be notified that the user will not be able to complete playback within an applicable viewing or playback limit when the user stops, pauses, rewinds, etc. The user may select to ignore the warning, to be reminded later, or to purchase additional rights.

BRIEF DESCRIPTION OF THE DRAWINGS

Further features of the invention, its nature and various advantages will become more apparent from the following detailed description of the preferred embodiments, taken in conjunction with the following drawings, in which like reference characters refer to like parts throughout, and in which.

DETAILED DESCRIPTION OF THE INVENTION

The present invention is now described in more detail in conjunction with FIGS. 1-17.

Figure 1:
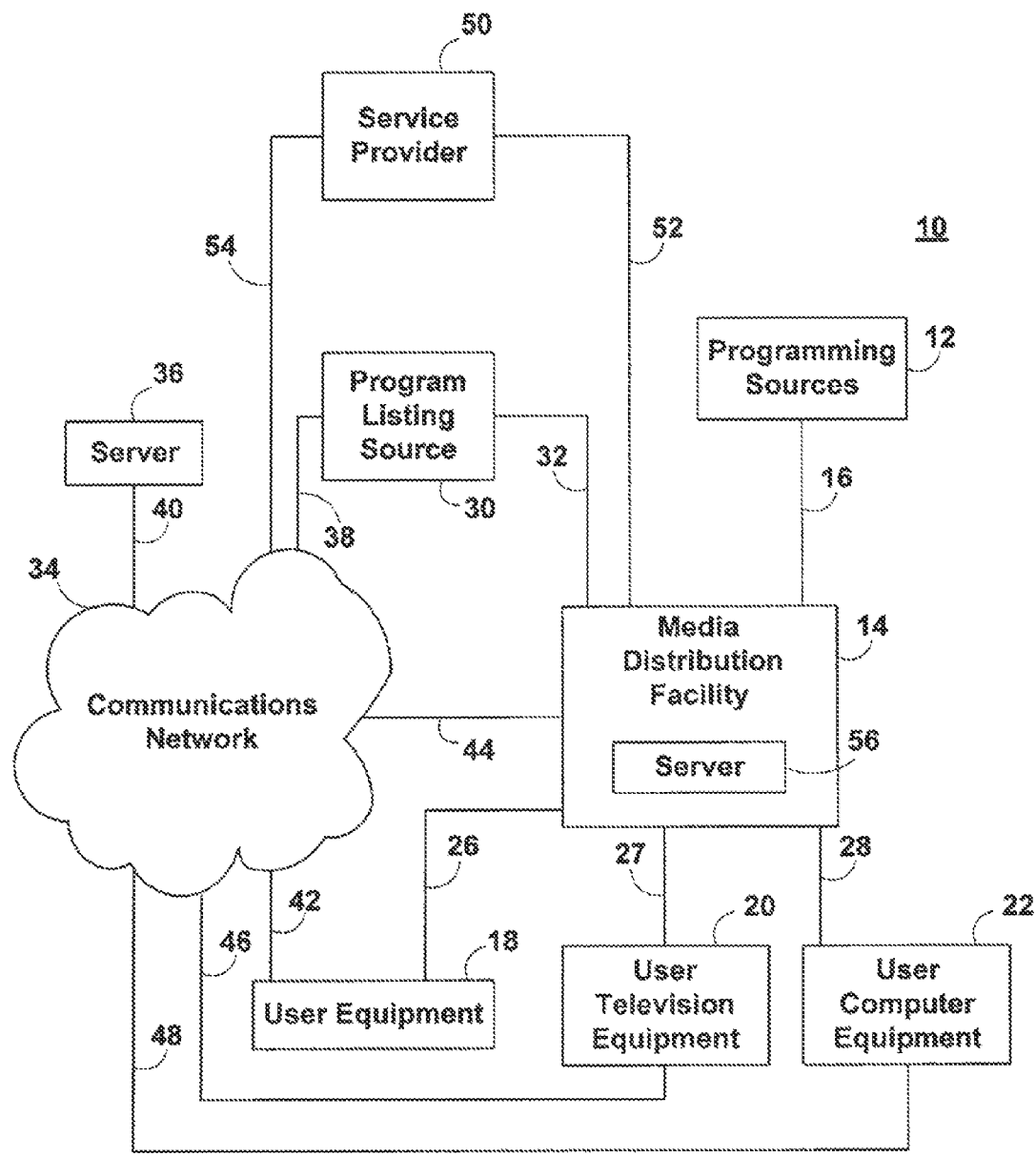
FIG. 1 is a diagram of an illustrative interactive media-on-demand system in accordance with the present invention.

An illustrative interactive television system 10 in accordance with the present invention is shown in FIG. 1. Multiple types of media programming may be provided from programming sources 12 to media distribution facilities such as media distribution facility 14 using communications path 16. Programming sources 12 may be any suitable sources of media programming, such as television and music production studios, etc.

Media distribution facility 14 may be a television distribution facility, a cable system headend, a satellite television distribution facility, a television broadcast facility, or any other suitable facility for distributing media programming. Typically, numerous television distribution facilities 14 are included in system 10.

Communications path 16 may be a satellite path, a fiber-optic path, a cable path, or any other suitable communications paths or combinations of such paths.

Media-on-demand programming may be provided using remote servers such as server 56 or other suitable media-on-demand equipment. If desired, servers such as server 56 or other media-on-demand equipment may be located at network nodes associated with media distribution facility 14 or other suitable locations. The network nodes may be intermediate communications points between media distribution facility 14 and user equipment 18, 20, or 22. Media-on-demand related information may be stored at a server (e.g., server 56), at user equipment (e.g., user equipment 18 or user television equipment 20), or at a combination thereof. Server 56 (and/or servers at network nodes) may provide on-demand delivery of media such as video-on-demand movies to user equipment.

Media distribution facility 14 may be connected to various user equipment devices 18. Such user equipment 18 may, for example, be located in the homes of users. User equipment 18 may include user television equipment 20 or user computer equipment 22.

The user equipment may receive television programming and other information from media distribution facility 14 over communications paths such as communications paths 26, 27, and 28. The user equipment may also transmit signals to media distribution facility 14 over paths 26, 27, and 28. Paths 26, 27, and 28 may be cables, free-space connections (e.g., for broadcast signals), telephone links, satellite links, etc.

Program listing source 30 may be used to provide the user with pricing, media and program information such as broadcast length, viewing limits, playback limits, or other limits. The program listing source 30 may also provide titles, running times, ratings information (e.g., parental ratings and critic's ratings), detailed title descriptions, information on actors and actresses, or other suitable information.

The program listing source 30 may have pricing information or may have information for setting the price of on-demand programs based on one or more factors such as: time of day, length of program, available bandwidth, anticipated bandwidth availability, popularity of program, or any other suitable factors. If desired, pricing may be variable based on such factors and may be determined at programming listings sources 30, media distribution facility 14, user equipment, or combinations thereof.

Program listing source 30 may provide media information and pricing information to television distribution facility 15 over communications path 32 for distribution to the associated user equipment over paths 26, 27, and 28. Communications path 32 may be a satellite communications path, coaxial cable path, radio frequency path, electromagnetic communications path, microwave communications path, optical communication path, or any other suitable communications path.

Program listing source 30 may not necessarily be a completely stand-alone facility. Program listings source 30 may be entirely part of programming sources 12, communications network 39, or a combination thereof.

An interactive television program guide application or other suitable application may be used to display program listings on the user's display. Examples of systems having program guides are illustratively shown in Knee et al. U.S. Pat. No. 5,589,892, Knudson et al. U.S. patent application Ser. No. 09/070,555, filed Apr. 30, 1998, and Knudson et al. U.S. patent application Ser. No. 09/357,941, filed Jul. 16, 1999, which are hereby incorporated herein by reference in their entireties.

If desired, program listings source 30 may distribute program pricing and schedule information to user equipment 18, user television equipment 20, and user computer equipment 22 over communications path 38, communications network 34, and communications paths 42, 46, and 48. Communications network 34 may be an Internet, intranet, telephone network, packet-based network, paging network, local area network (LAN), wide area network (WAN), virtual private network (VPN), metropolitan area network (MAN), or any other suitable communications network.

An on-line program guide may be provided using a server connected to communications network 34 such as server 36.

Server 36 may receive program guide information such as pricing and program schedule information from program listings source 30 via communications path 38, communications network 34, and communications path 40. Paths 38 and 40 may be satellite paths, fiber-optic paths, wired paths, wireless paths, or any other suitable paths.

User equipment 18 may access server 36 (e.g., access to information stored in server 36) via communications path 42, which may be any suitable communications path such as a wired path, a cable path, fiber-optic path, satellite path, a combination of such paths, or any other suitable path. User equipment 18 may also have access to server 36 (e.g., to have access to information such as program and pricing information stored at server 36) via communications path 26, television distribution facility 14, and communications path 44. For example, a cable modem or the like may be used by user equipment 18 to communicate with television distribution facility 14. Television distribution facility 14 may communicate with communications network 34 over path 44, which may be a wired path, a cable path, fiber-optic path, satellite path, a wireless path, or any other path or combination of paths.

User equipment such as user television equipment 20 and user computer equipment 22 may access server 36 to access on-line program and pricing information using similar arrangements. User television equipment 20 may access server 36 using communications path 46 or using path 27, television distribution facility 14, and path 44. User computer equipment 22 may access server 36 using communications path 48 or using path 28, television distribution facility 14, and path 44. Paths 46 and 48 may be wired paths, cable paths, fiber-optic paths, satellite paths, wireless paths, or any other suitable paths or combination of paths.

Interactive media applications other than program guide applications may use service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, or any other suitable path or combination of paths.

The interactive media program guide application, and the home shopping application are only two illustrative examples of the types of interactive television applications that may be supported by system 10. Other suitable applications that may be supported include games-on-demand, news services, Internet services, interactive wagering services (e.g., for wagering on horse races and the like), communications services (e.g., e-mail, chat, etc.), and any other suitable interactive applications.

These applications may be implemented locally on the user equipment. The applications may also be implemented using a client-server architecture in which the user equipment serves as a client processor and a server such as server 56 at television distribution facility 14 or other suitable location acts as a server processor. Other distributed architectures may also be used if desired. Regardless of the particular arrangement used to implement interactive media features related to program guides, home shopping, video-on-demand, Internet, communications, etc., the software that supports these features may be referred to as an application.

Figure 2:
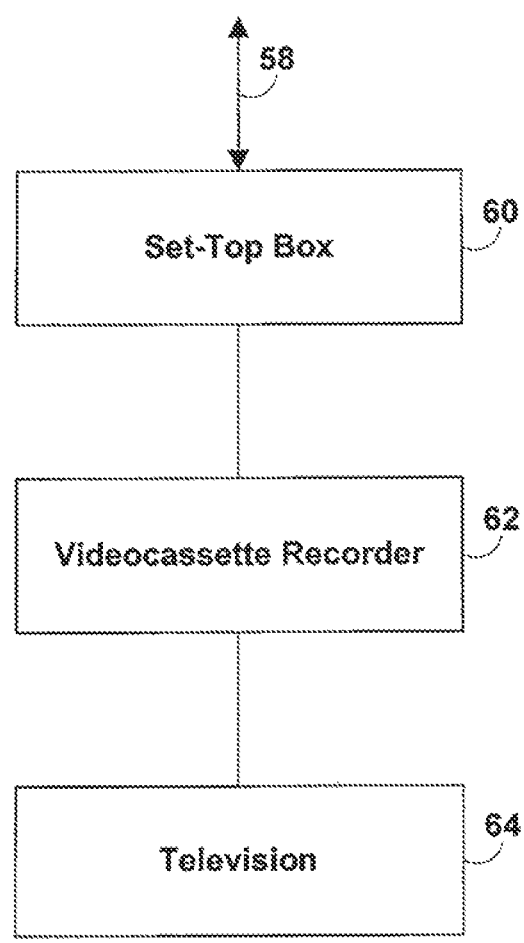
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Programming information, pricing, and other information may be received using input/output 58. Commands and requests and other information from the user may also be transmitted over input/output 58.

Set-top box 60 may be any suitable analog or digital set-top box. Set-top box 60 may contain an analog tuner for tuning to a desired analog television channel. Set-top box 60 may also contain digital decoding circuitry for receiving digital television or music channels. Both analog and digital channels may be handled together if desired. Set-top box 60 may also contain a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage may be used to back up data and to otherwise support larger databases than may be supported using random-access memory approaches.

Set-top box 60 may have infrared (IR) or other communications circuitry for communicating with a remote control. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, etc. for communications with other equipment. Such communications may involve the Internet or any other suitable communications networks or paths.

An optional videocassette recorder 62 or other suitable recording device may be connected to set-top box 60. This allows videos from set-top box 60 to be recorded. For example, if set-top box 60 is tuned to a given television channel, the video signal for that television channel may be passed to videocassette recorder 62 for recording on a videocassette. If desired, videocassette recorder 62 may have functions such as start, stop, record, or other suitable operational functions. Videocassette recorder 62 may be controlled by set-top box 60. For example, set-top box 60 may control videocassette recorder 62 using infrared commands directed toward the remote control inputs of videocassette recorder 62.

The output of videocassette recorder 62 may be provided to television 64 for display to the user. If videocassette recorder 62 is not being used, the video signals from set-top box 58 may be provided directly to television 64. If desired, any suitable monitor may be used to display the video.

Figure 3:
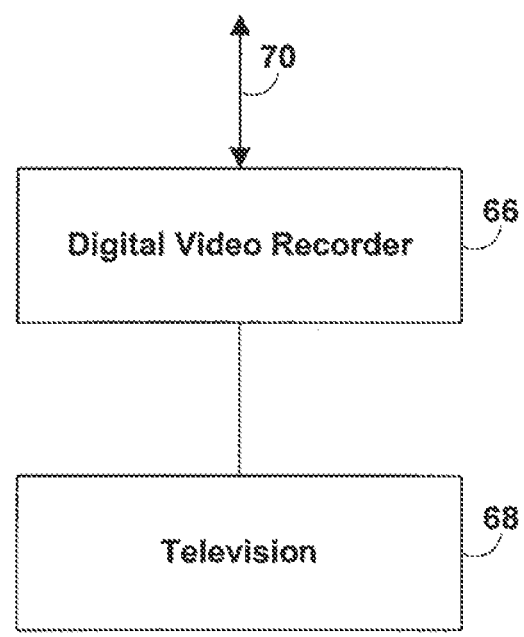
FIG. 3 is a diagram of additional illustrative user television equipment in accordance with the present invention.

Another illustrative arrangement for user television equipment 20 is shown in FIG. 3. In the example of FIG. 3, user television equipment 20 includes a digital video recorder 66 and a television 68. Input/output 70 may be connected to communications paths such as paths 27 and 46. Television programming and other information may be received using input/output 70. Commands and requests and other information from the user may be transmitted over input/output 70.

Digital video recorder 66 may include a hard disk or other suitable digital storage medium for video storage in lieu of videocassettes. The hard disk may be internal to digital video recorder 66.

Digital video recorder 66 may contain an analog tuner for tuning to a desired analog television channel. Digital video recorder 66 may also contain an encoder (e.g., an MPEG encoder) for converting analog television programming or the like into digital signals for storage. Digital video recorder 66 may contain digital decoding circuitry for receiving digital television channels. If desired, digital video recorder 66 may contain circuitry for handling both analog and digital channels. Digital video recorder 66 also contains a processor (e.g., a microcontroller or microprocessor or the like) that is used to execute software applications. Digital video recorder 66 may contain memory such as random-access memory for use when executing applications. Nonvolatile memory may also be used to store a boot-up routine or other instructions. The hard disk and other storage in digital video recorder 66 may be used to support databases (e.g., program guide databases or interactive television application databases).

Digital video recorder 66 may have IR communications circuitry or other suitable communications circuitry for communicating with a remote control. Digital video recorder 66 may also have dedicated buttons and a front-panel display. The front-panel display may, for example, be used to display the current channel to which the digital video recorder is tuned.

Digital video recorder 66 may also have communications circuitry such as a cable modem, an integrated services digital network (ISDN) modem, a digital subscriber line (DSL) modem, a telephone modem, or other suitable communications circuitry for communications with other equipment. Such communications may involve the Internet or any other suitable communications networks or paths.

Television programming may be recorded on the hard disk of digital video recorder 66. Digital video recorder 66 may record new video while previously recorded video is being played back on television 68. This allows users to press a pause button during normal television viewing. When the pause button is pressed, the current television program is stored on the hard disk of digital video recorder 66. When the user presses play, the recorded video may be played back. This arrangement allows the user to seamlessly pause and resume television viewing.

The set-top box arrangement of FIG. 2 and the digital video recorder set-top box arrangement of FIG. 3 are merely illustrative. Other arrangements may be used if desired. For example, user television equipment may be based on a WebTV box, a personal computer television (PC/TV), or any other suitable television equipment arrangement. The digital video recorder may be a personal video recorder such as TiVo or ReplayTV. If desired, the functions of components such as set-top box 60, digital video recorder 66, a WebTV box, or PC/TV or the like may be integrated into a television or personal computer or other suitable device. Other suitable devices may include arrangements not based on user television equipment. For example, user equipment may be based on a WAP enabled phone, a handheld computing device, digital audio devices, or the like.

Figure 4:
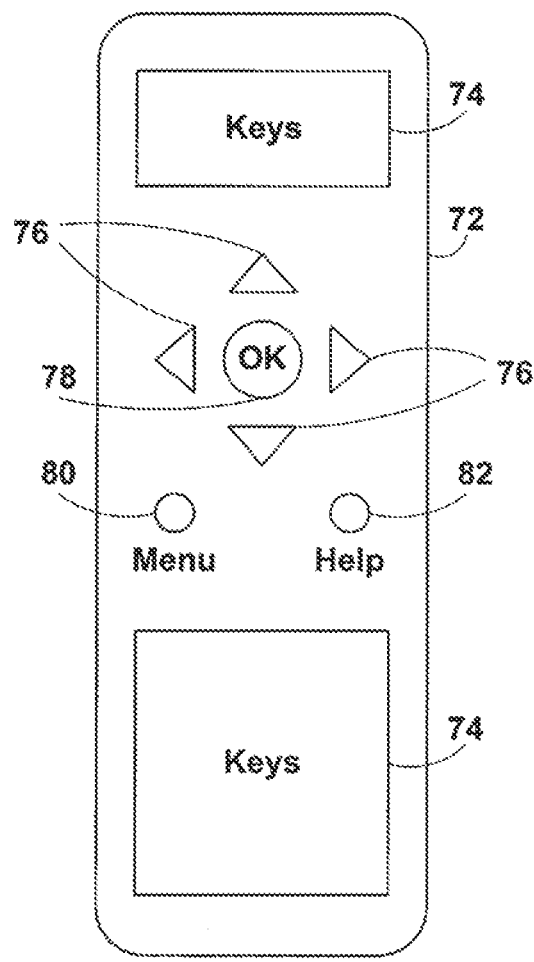
FIG. 4 is a diagram of an illustrative remote control in accordance with the present invention.

An illustrative remote control 72 for operating user television equipment 20 is shown in FIG. 4. Remote control 72 may have keys 74 such as channel up and down keys, a power on/off key, numeric keys, a favorites key (e.g., for setting favorites in a program guide application or other interactive media application), an info key (for requesting that additional information on a selection be displayed), media control keys (e.g., play, pause, fast forward etc.), and the like. Arrow keys 76 may be used to position an on-screen cursor or highlight region on options of interest. Highlighted options may be selected using OK key 78. Menu key 80 may be used to direct an interactive television application (e.g., a program guide application, a shell application, or any other suitable application) to display a menu of available options.

Help key 82 may be used to invoke help functions such as live customer service, access to a help database, or other suitable functions.

Figure 5:
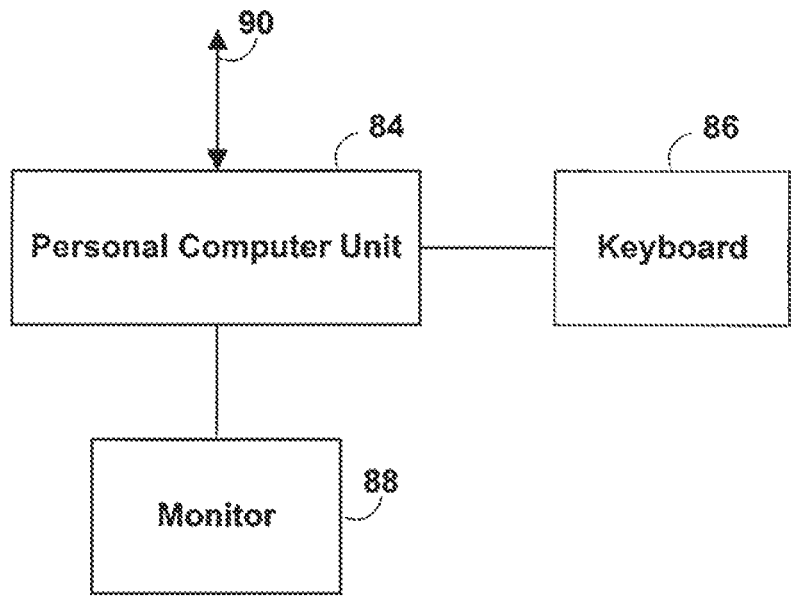
FIG. 5 is a diagram of illustrative user computer equipment in accordance with the present invention.

Illustrative user computer equipment 22 is shown in FIG. 5. In the arrangement of FIG. 5, personal computer 84 may be controlled by the user using keyboard 86 or other suitable user input device, such as a trackball, mouse, touch pad, touch screen, voice recognition system, or other suitable input device. Media programs and interactive application content may be displayed on monitor 88. Media programs and other information may be received from paths 28 and 48, as shown in FIG. 1, using input/output 90. The user may also send commands and other information to remote services over input/output line 90.

Personal computer unit 84 may contain a television tuner card or other means for decoding analog and digital television channels. The television tuner card (or other decoding means) may contain an analog tuner for tuning to a given analog channel and digital decoding circuitry for filtering out a desired digital channel from a packetized digital data stream. The personal computer unit 84 may also contain hardware or software for decoding and utilizing music or other media.

User computer equipment 22 and the arrangement of user computer equipment 22 of FIG. 5 are illustrative. Any suitable computer equipment arrangement may be used if desired.

Moreover, the user television equipment and user computer equipment arrangements described above are illustrative. Any suitable equipment arrangement may be used.

Figure 6:
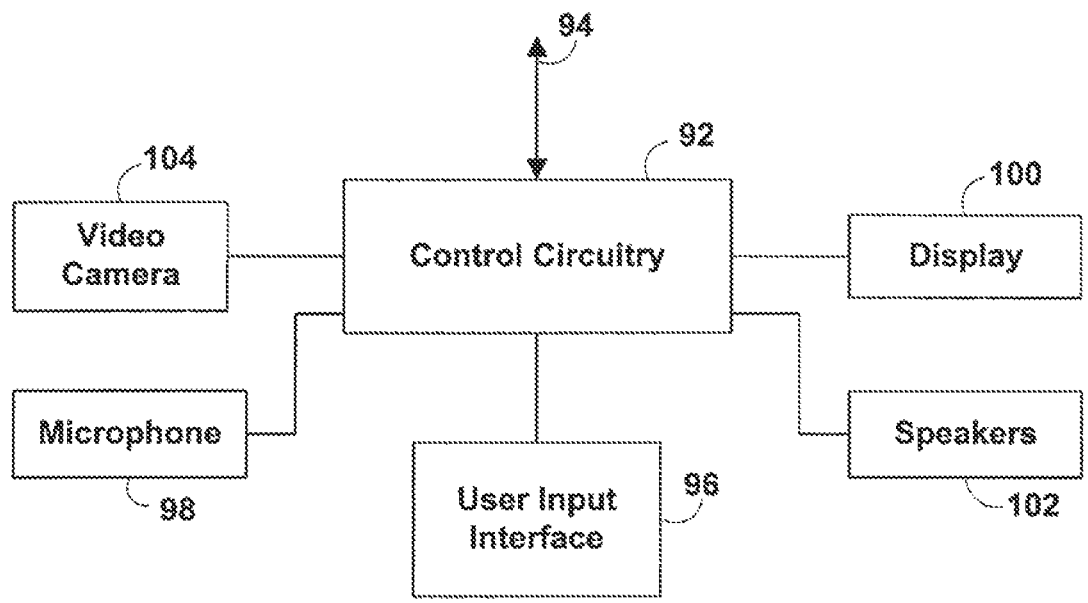
FIG. 6 is a generalized diagram of illustrative user equipment in accordance with the present invention.

As shown in FIG. 6, control circuitry 92 is connected to input/output 94. Input/output 94 may be connected to communications paths such as paths 26, 27, 28, 42, 46, and 48 of FIG. 1. Television programming, video-on-demand programming, music programming and/or other programming may be received via input/output 94 (e.g., from programming sources 12 and television distribution facility 14). Program schedule and pricing information for an interactive television program guide and information on programs (e.g., on-demand programming) may also be received via input/output 94. Input/output 94 may also be used to receive information for other interactive television applications. The user may use control circuitry 92 to send commands, requests, and other suitable information using input/output 94.

Control circuitry 92 may be based on any suitable processor such as a microprocessor, microcontroller, etc. Memory or other suitable storage devices may be provided as part of control circuitry 94. Tuning circuitry such as an analog tuner, an MPEG-2 decoder or other digital tuning circuitry, or any other suitable tuning circuits or combinations of such circuits may also be included as part of circuitry 92. The tuning circuitry may be used to tune the user equipment to a particular channel to receive television programming, video-on-demand programming, music or games etc.

Video-on-demand programming and on-screen options and information may be displayed on display 100. Display 100 may be a monitor, a television, or any other suitable equipment for displaying visual images. Speakers 102 may be provided as part of a television, a computer or may be stand-alone units. Digital music and the audio component of videos displayed on display 100 may be played through speakers 102.

A user may control the control circuitry using user input interface 96. The user input interface may be any suitable user interface, such as a mouse, trackball, keypad, keyboard, touch screen, touch pad, or any other suitable user input interface. A microphone 98 and video camera 104 may be used to supply audio and video information to control circuitry 92.

A user of user equipment 18 (e.g., user television equipment, user computer equipment, or any other suitable user equipment device) may invoke an interactive program guide menu (e.g., a program guide menu of a media-on-demand guidance application) by pressing menu button 80 (FIG. 4) or selecting an appropriate on-screen option from a menu or the like.

Figure 7:
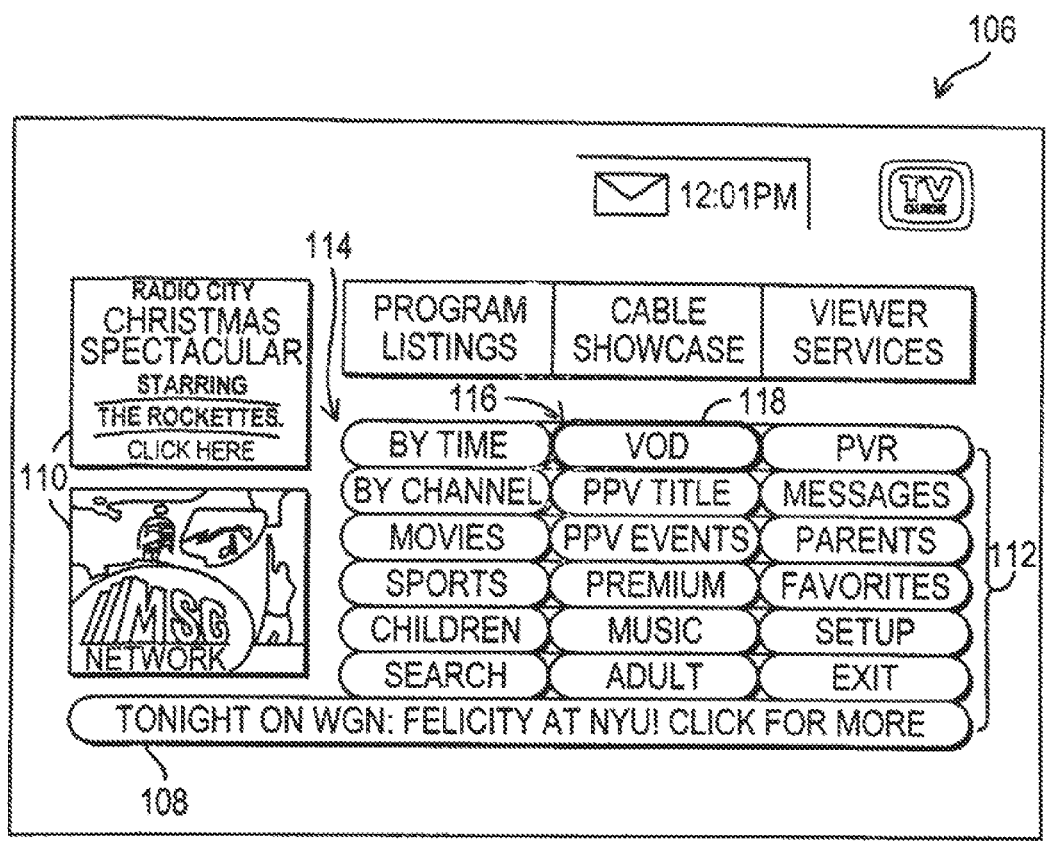
FIG. 7 shows an illustrative video-on-demand menu screen in accordance with the present invention.

An illustrative interactive television program guide navigation display screen 106 is shown in FIG. 7. Screen 106 may contain selectable advertisements such as advertisements 108 and 110. Screen 106 may also contain viewer services options 112. Suitable viewer services options 112 include an option to access features and/or information of a personal video recorder (or other recording devices), an option to access messages (either e-mail messages or messages provided from television system service provider), an option to adjust parental control settings (e.g., blocked channels or ratings, etc.), an option to set favorites (e.g., favorite channels, etc.), an option to set up the program guide or user equipment, and an option to exit screen 106.

Screen 106 may also contain program listings options 114. Options 114 may include an option to view program listings organized by time, organized by channel, or organized by genre (e.g., sports, children, etc.). Options 114 may also include an option to search for programs of interest (e.g., using keywords, based on a title search, based on an actor search, etc.).

Cable showcase options 116 may be selected to access video-on-demand program listings, pay-per-view program listings, pay-per-view event listings, premium program listings, music program listings, or adult program listings.

Options may be selected using highlight region 118 or other such arrangement. Remote control 72 (FIG. 4) may be used to position highlight region 118 on top of options 112, 114, and 116. The highlighted option may be selected by pressing a select, enter, or OK key such as remote control key 78 of FIG. 4.

Figure 8:
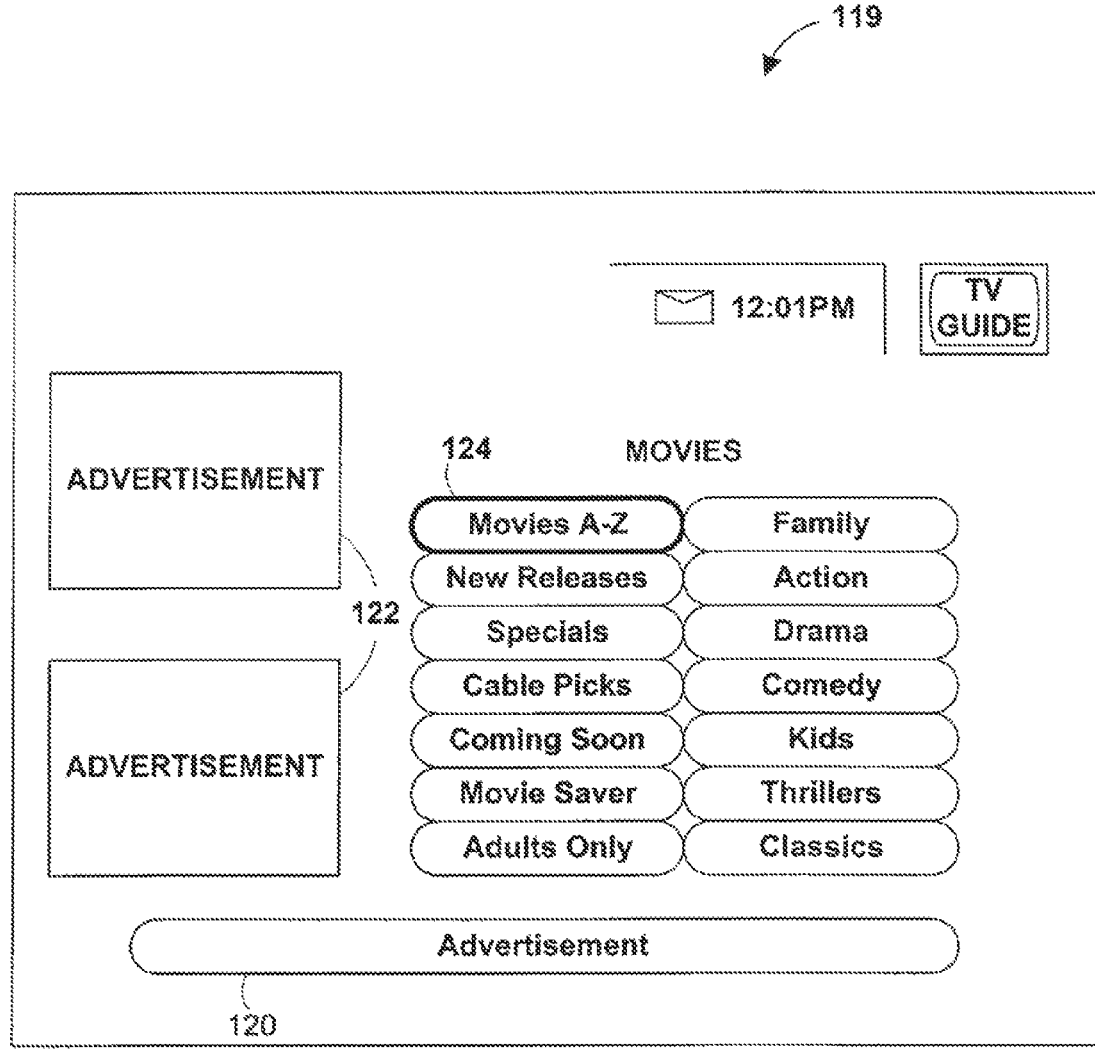
FIG. 8 shows an illustrative video-on-demand program guide screen in accordance with the present invention.

If the user selects the VOD option of FIG. 7, the program guide may present the user with a screen such as display screen 119 of FIG. 8. Screen 119 may contain interactive advertisements 120 and 122. When the user selects an interactive advertisement from any of the program guide screens, the program guide may provide the user with additional information, with an opportunity to order a program or product, with an opportunity to set a reminder, etc.

Screen 119 may also contain various options that allow the user to view video-on-demand program listings organized by different genres (e.g., family, action, drama, comedy, kids, thrillers, classics, etc.). When the user selects one of these options, the program guide may display a display screen in which all of the displayed program listings are video-on-demand program listings in the genre associated with the selected option.

Figure 9:
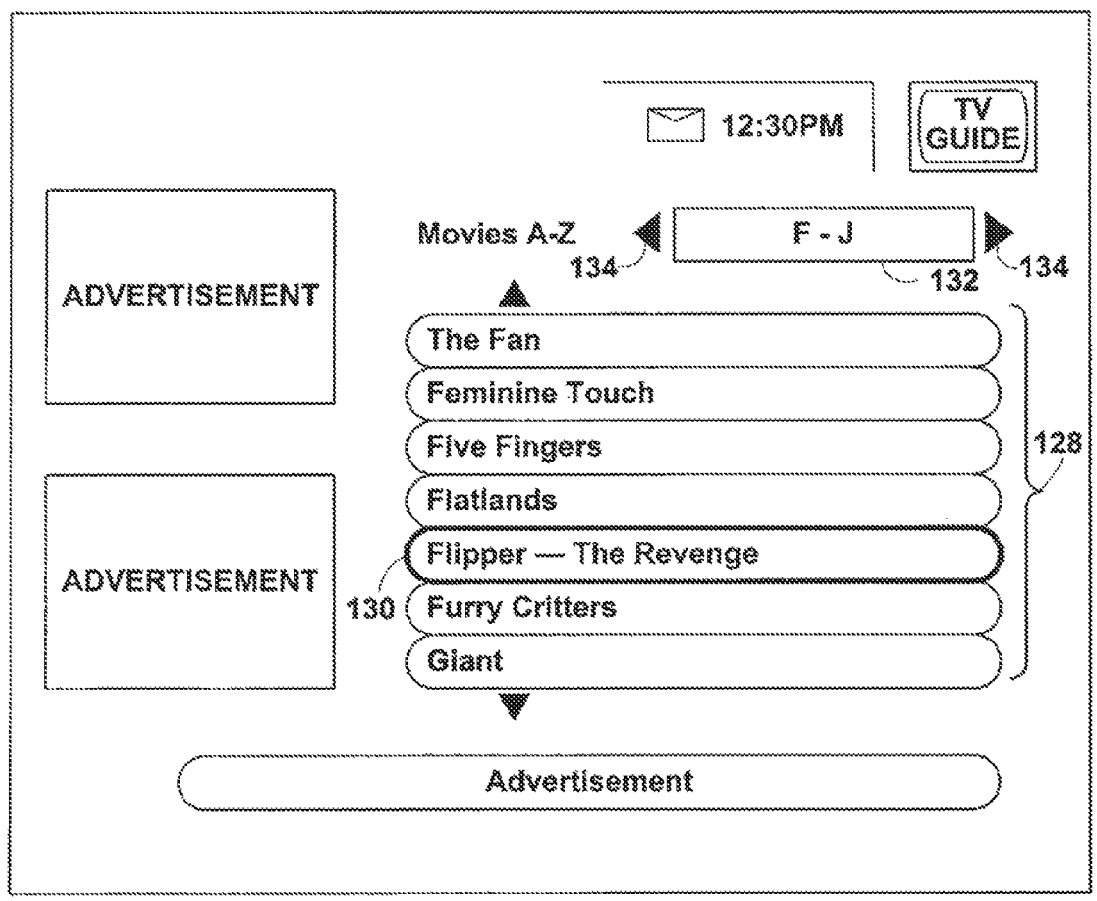
FIG. 9 shows an illustrative program guide screen containing video-on-demand movie listings in accordance with the present invention.

If the user selects movies A-Z option 124 of screen 119, the program guide may present a display screen such as display screen 126 of FIG. 9 in which video-on-demand program listings 128 are listed alphabetically.

The alphabetical range covered by screen 126 may be shown in region 132. As indicated by arrows 134, the user may use remote control right and left arrow keys or the like to navigate forwards or backwards in the list. The user may select a video-on-demand program listing of interest using highlight region 130.

Figure 10A:
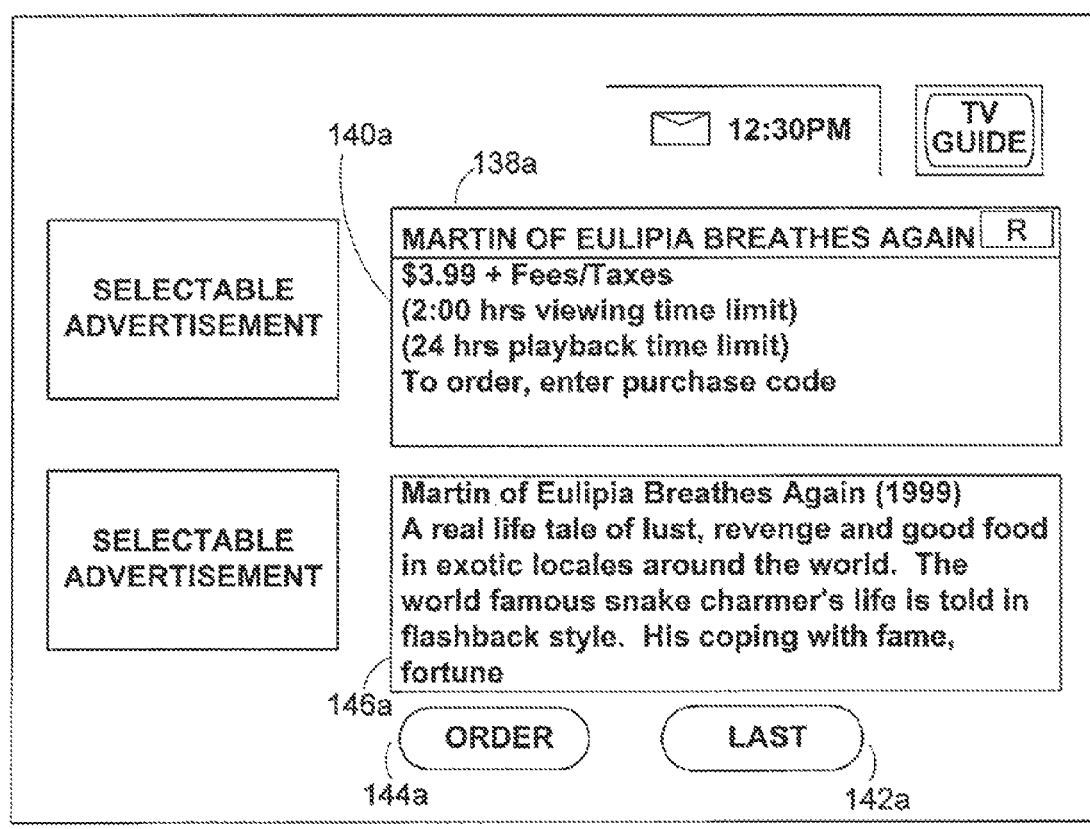
FIG. 10a shows an illustrative video-on-demand ordering screen that may be provided in accordance with the present invention.
Figure 10B:
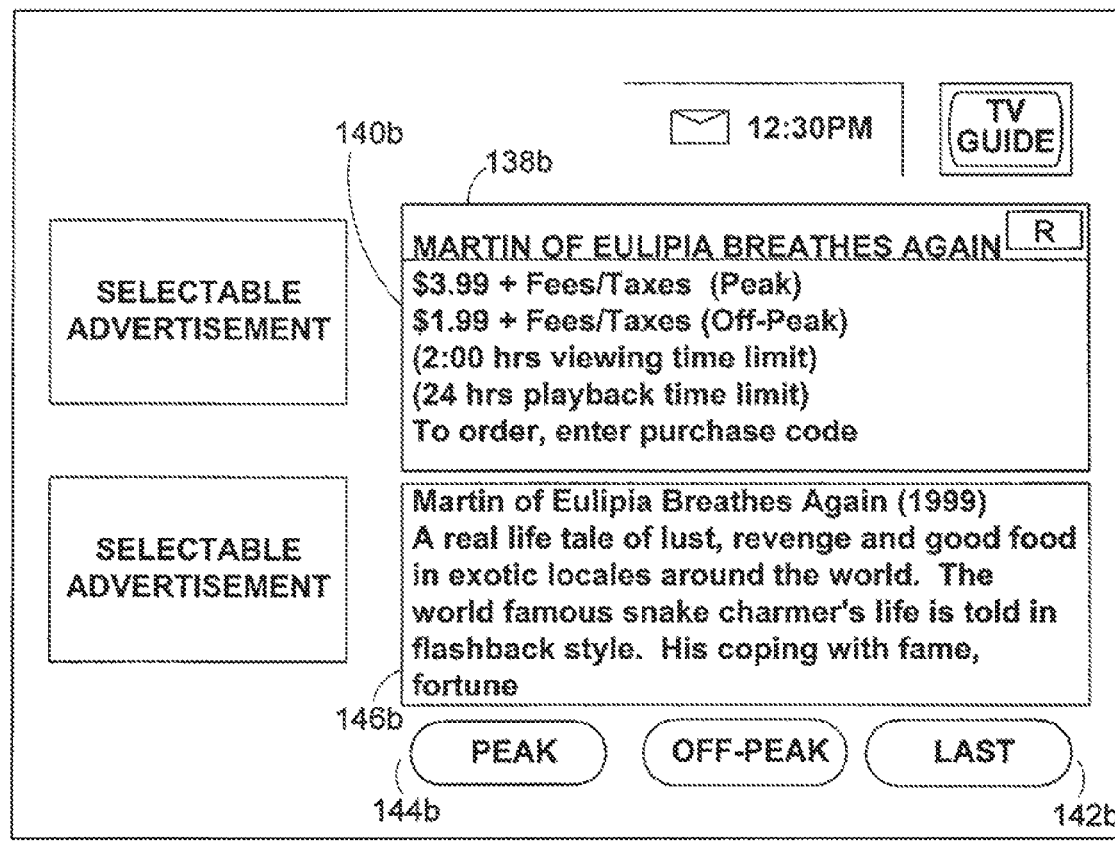
FIG. 10b shows an illustrative video-on-demand ordering screen that may be provided in accordance with the present invention.

An illustrative video-on-demand ordering display screen 136 that may be displayed when the user selects a video-on-demand listing from the list of FIG. 9 or any other list containing a video-on-demand program listing is shown in FIGS. 10*a* and 10*b*. FIG. 10*a* shows an alternative where the guidance application informs the user of the streaming time and pricing for delivery of the selected program. FIG. 10*b* shows an alternative where the user is given delivery options.

Ordering screen 136*a* of FIG. 10*a* may contain information 138*a* on the title of the user's selection, the rating for the selection, the streaming time and pricing. A detailed information region such as information region 146*a* may also be provided. Region 146*a* may include a detailed description of the selection, information on the actors in the movie, the running time, the year of release, etc.

If the user selects "last" option 142*a*, the user may be taken back to screen 126 of FIG. 9. If the user desires to purchase the video-on-demand program, the user may use remote control 72 of FIG. 4 to enter the user's request. Once the user request is entered in region 144*a*, the program guide determines the pricing and viewing rights based on an individual factor or a combination of factors such as: time of day at time of delivery, length of program, available bandwidth, anticipated bandwidth availability at time of delivery, popularity of program or other suitable factors.

An alternative arrangement is shown in FIG. 10*b*. In this arrangement the user chooses whether the delivery of the media-on-demand item is to be made at peak or off-peak rates. The user makes the selection by choosing either the "PEAK" or "OFF-PEAK" regions of 144*b*.

When a valid request is received by the program guide, the program guide may request a delivery time and authorize the distribution of the selected video-on-demand program to the user from server 56 (FIG. 1) or other suitable distribution source at the designated time. If desired, text may be displayed in display screen 136*b* that identifies the peak viewing window and the off-peak viewing window. The text may also identify different pricing that is associated with peak and off-peak viewing windows. A user may select one of the available viewing windows so that the desired program is available on demand during that selected viewing window. If desired, the display region may include a single option for ordering a media-on-demand item and the system may determine whether an off-peak or peak rate applies based on the time of day at which the media-on-demand item was ordered. Examples of media-on-demand systems utilizing bandwidth management are shown in William Thomas, et al. U.S. Application No. UV-207, filed concurrently herewith, which is hereby incorporated by reference in its entirety.

Figure 11:
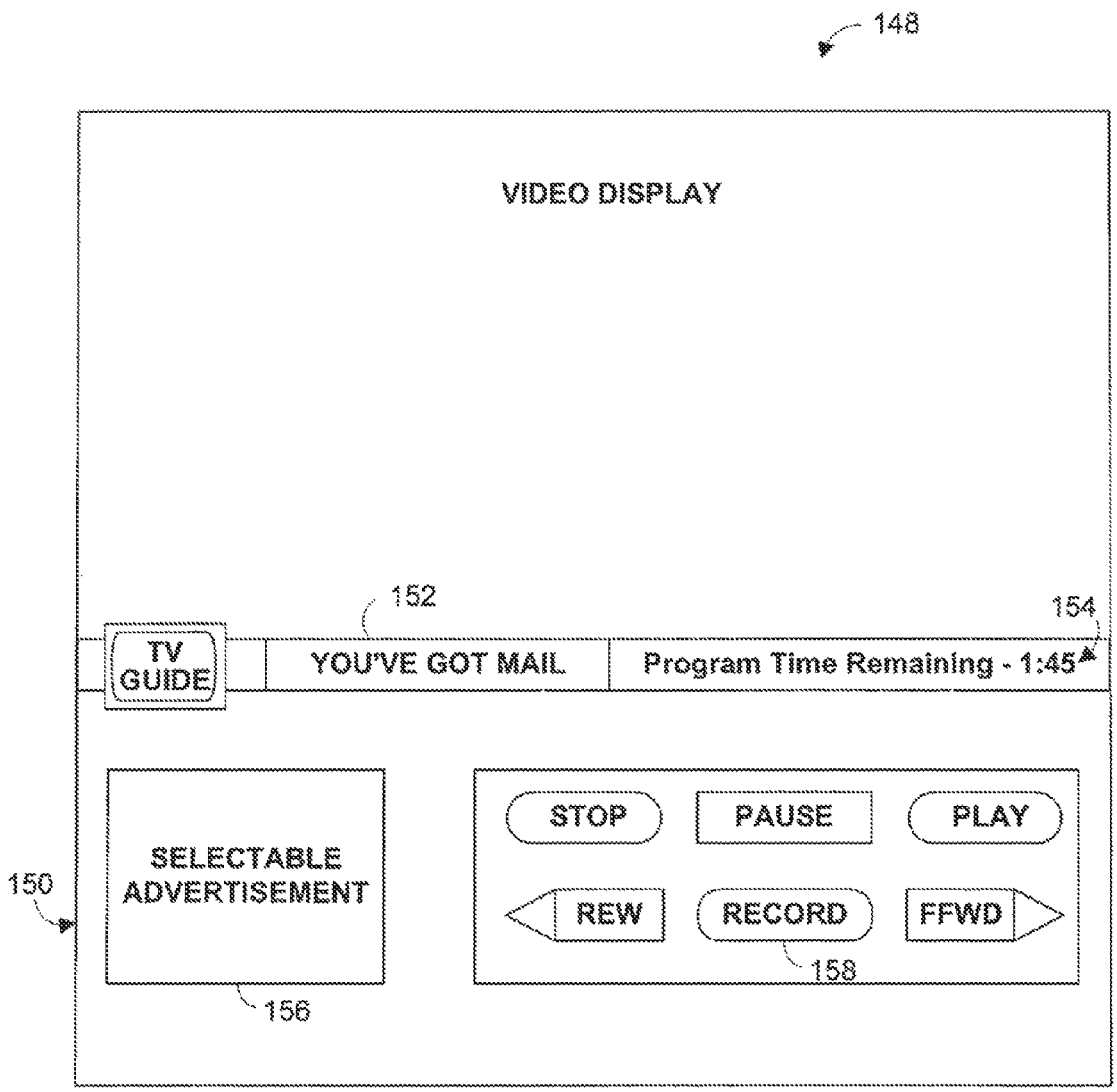
FIG. 11 shows how an information region with playback controls may be provided by the program guide when a video-on-demand program is being played for the user in accordance with the present invention.

The requested video-on-demand program may be displayed in display screen 148 of FIG. 11. A region 150 may be included in screen 148 that contains program title information 152 and program-time-remaining information 154 for the video-on-demand program that is being displayed. If desired, status information on the current status of that user's viewing rights for that media-on-demand item may also be displayed. The information may be displayed either simultaneous with the media-on-demand item or displayed upon user action. Region 150 may also contain a selectable advertisement 156. Region 150 may be provided as an overlay over the video-on-demand program, as an L-shaped frame region surrounding a reduced-size video window, or in any other suitable configuration or layout. Region 150 may be invoked whenever a user presses an appropriate remote control key and may be removed, for example, after a specified period of inactivity. Examples of control options are shown in William Thomas, et al., U.S. Application No. (UV-215), filed concurrently herewith, which is hereby incorporated by reference in its entirety.

Region 150 may contain on-screen control options 158. Control options 158 may be selected by the user to stop, pause, play, rewind, record, or fast-forward the video-ondemand program. Such options are typically only available for use during the viewing window of a media-on-demand item. When the user selects a control command, the program guide may direct server 56 or other suitable equipment to perform the requested function. For example, when the user selects the stop control option 158, the program guide may direct the server 56 to stop transmitting the video-on-demand program to the user equipment. If the user selects rewind option 158, the program guide directs the server 56 to skip to an earlier portion of the video-on-demand program. A real-time rewind process may be used in which the video-on-demand programming is displayed during the rewind operation. Commands for pausing, playing and fast-forwarding may be handled similarly. When the user selects the record command 158, the system may allow the user to record programs on local or remote storage. Some examples of local storage are a local video cassette recorder, a local hard-disk, or personal video recorder or other digital storage device. An example of remote storage devices is a remote server.

A user who "records" the video-on-demand selection may be provided with playback limits. The program guide may disclose these limits at the time of purchase. For example, display screen 136a of FIG. 10a includes information that identifies the playback limit for that on-demand program. The playback limit may be 24 hours, a week, a month, etc. The playback limit may be set to prevent the user from replaying a personal recording of a purchased on-demand program beyond a certain authorized time period. Techniques for implementing such playback limits may be implemented at a remote server (e.g., server 56), a digital video recorder, etc. Techniques for implementing such limits are known to those skilled in the art. These are merely illustrative examples. Any suitable technique for handling video-on-demand recordings may be used if desired.

Figure 12A:
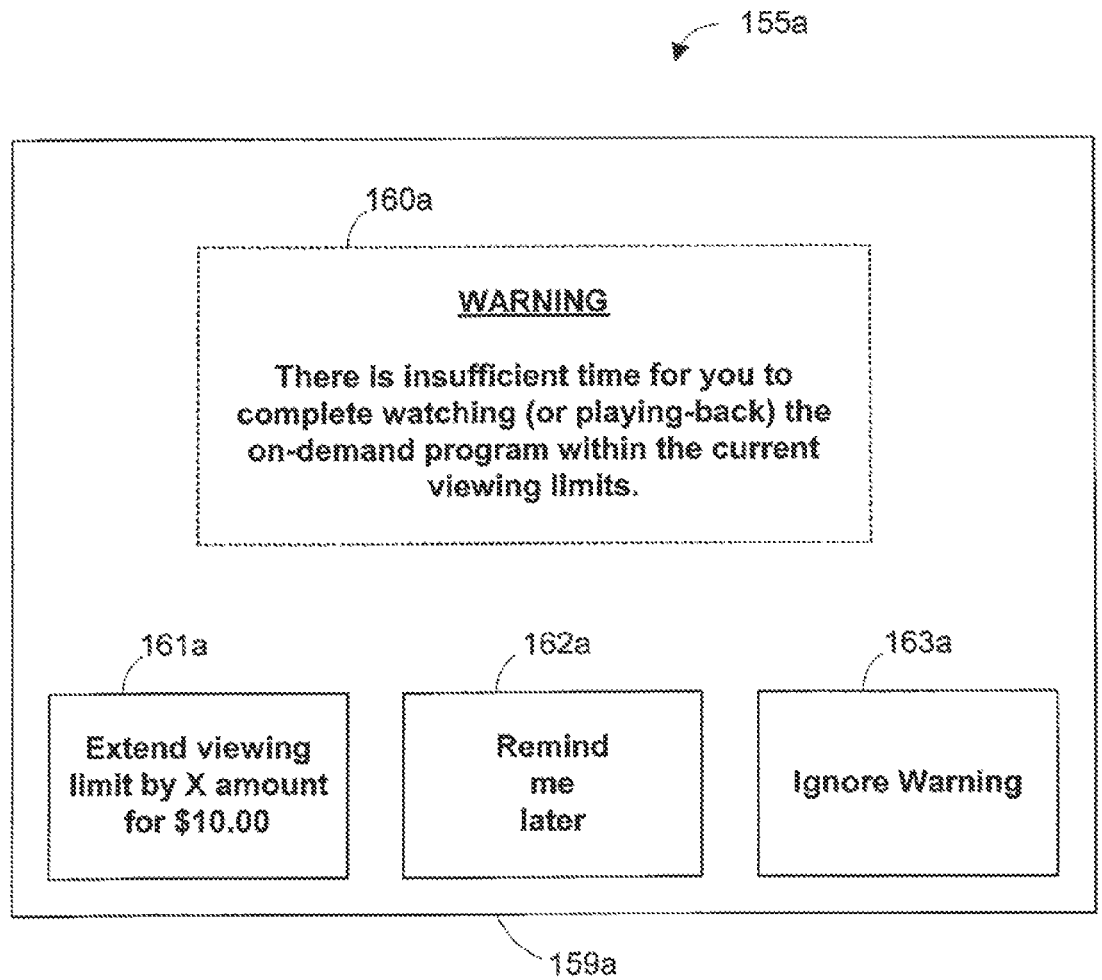
FIGS. 12A and 12B show an illustrative warning screen that may be provided in accordance with the present invention.

An illustrative warning display screen is shown in FIG. 12a. Warning display screen 159a may be displayed in response to actions that a user has taken in controlling a program or based on monitoring criteria such as the length of the media, the user's position in the media, the maximum allowable streaming time, the viewing window, etc. This warning screen may be displayed when what remains to be viewed in a particular program is longer in length than what remains in the current viewing window, in the current playback limit, or in the currently available streaming time.

A warning display screen 159a may also be displayed at a predetermined time prior to the end of the viewing limits. For example, the warning screen may be displayed at a particular time before the end of the viewing window to remind the user that the end of the viewing window is approaching.

As shown, warning screen 159a may include several options 161a for extending the viewing rights of that user (e.g., extend viewing window, streaming time, playback limit). The warning screen may also include options 162a and 163a that will allow the user to continue with the program regardless of the time shortfall. A user may select option 162a to be reminded of the warning at a later time (e.g., a reasonable time later). A user may select option 163a to continue to watch the program without any further warnings.

Figure 12B:
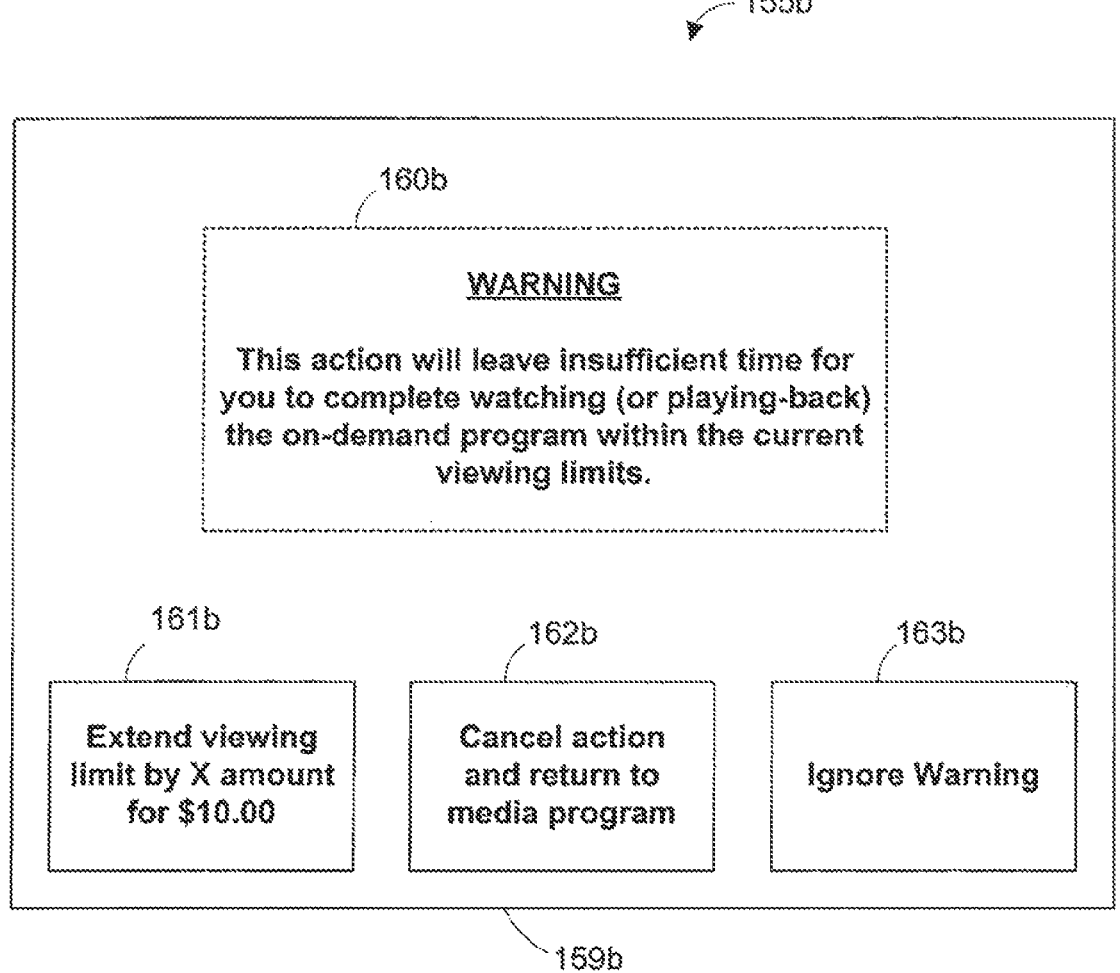

Another illustrative warning display screen is shown in FIG. 12b. Warning display screen 159b may be displayed in response to actions that the user selects to take in controlling the program or based on monitoring criteria such as length of the media, the user's position in the media, the maximum allowable streaming times, the viewing window, etc. This warning screen may be displayed when the user wishes to access a point in the media such that what remains to be viewed in the particular program is longer in length than the current viewing window, the current playback limit, or the currently available streaming time. The user may be allowed to select to confirm 163b or cancel the selection made by the user in controlling the media. Additionally, the user may be given the opportunity to purchase additional rights 161b.

Figure 13:
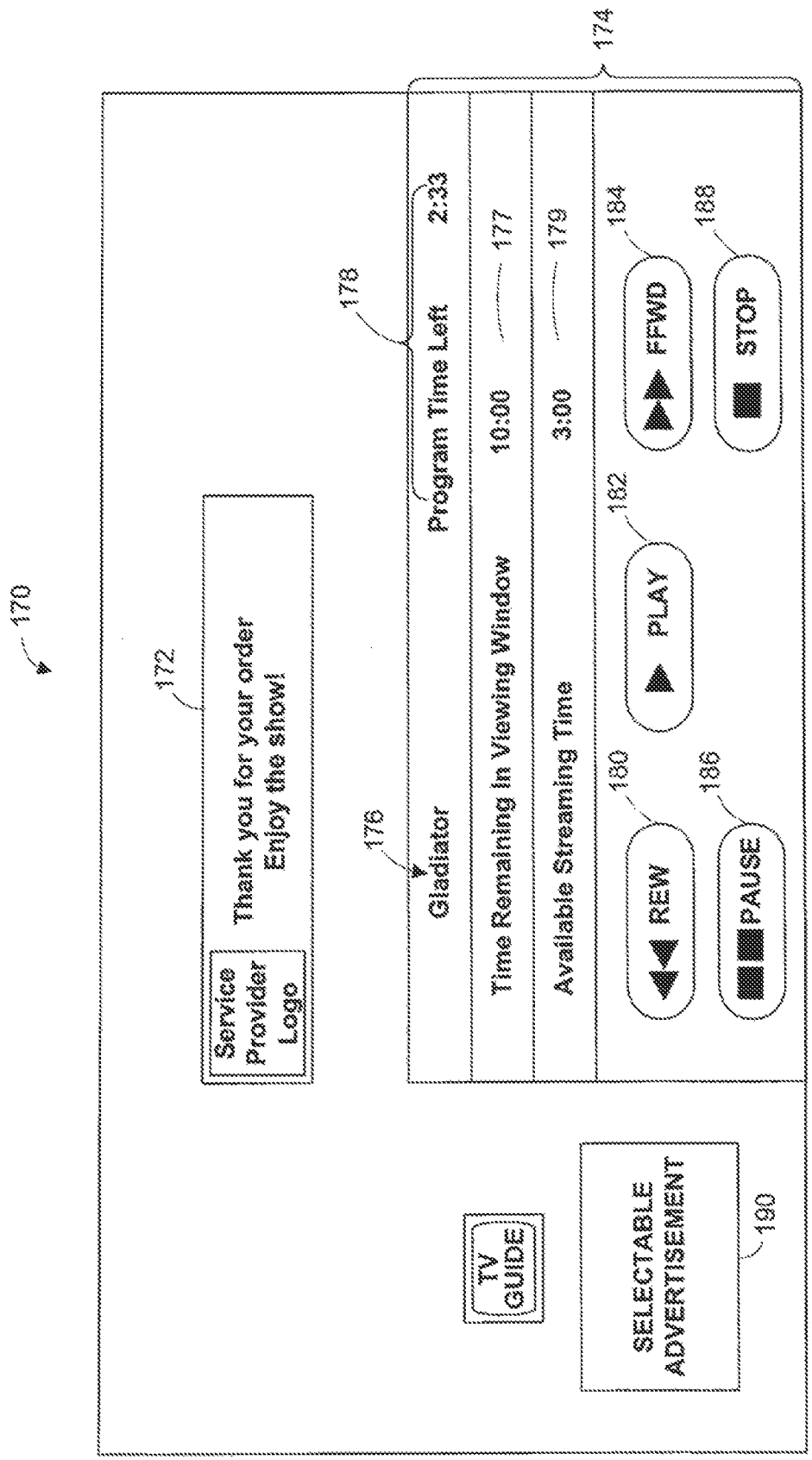
FIG. 13 illustrates a screen that allows a user to manipulate the delivery of a media-on-demand item in accordance with the present invention.

FIG. 13 illustrates a display screen that allows a user to manipulate the delivery display of a media-on-demand item. As shown media-on-demand delivery screen 170 may include delivery message window 172, delivery control window 174, media title 176, viewing window, program time remaining indicator 178, rewind control 180, play control 182, fast forward control 184, pause control 186, stop control 188, and interactive advertisement banner 190, etc. or combinations thereof. Media-on-demand delivery screen 170 may display video over which delivery message window 172 is displayed or may include scaled video in a window in display screen 170. The video may be video of the current media-on-demand item (e.g., Gladiator).

Delivery message window 172 may be displayed when a user has selected a media-on-demand item for delivery.

Delivery controls window 174 may include media title 176, program and/or viewing window time remaining indicator 178, rewind control 180, play control 182, fast forward control 184, pause control 186, stop control 188 and interactive advertisement 190. Media title may be the title of the media to be delivered. Rewind control 180 may allow a user to return to an earlier portion of the delivery of the deliverable media. Play control 182 may allow delivery of the selected media item to the user. Fast forward control 184 may allow a user to go to a later portion of the deliverable media. Pause control 186 may allow a user to temporarily halt the delivery of the selected media item. Stop control 188 may allow a user to discontinue the delivery of the selected media item.

If desired, delivery controls window 174 may include viewing window region 177 for informing a user of approximately how much time remains in the viewing window for watching the current on-demand program and may include streaming time limit region 179 for informing the user of how much time remains in the streaming time limit for the current on-demand program. If desired, such information may be updated continuously or periodically. If desired, such information may be updated and displayed when (e.g., only when) a user stops a current on-demand program that is playing.

Interactive advertisement area 190 may display advertising. A user may select area 190 to view more information regarding the advertised product. Selecting area 190 may allow a user to purchase the advertised product or service.

Figure 14:
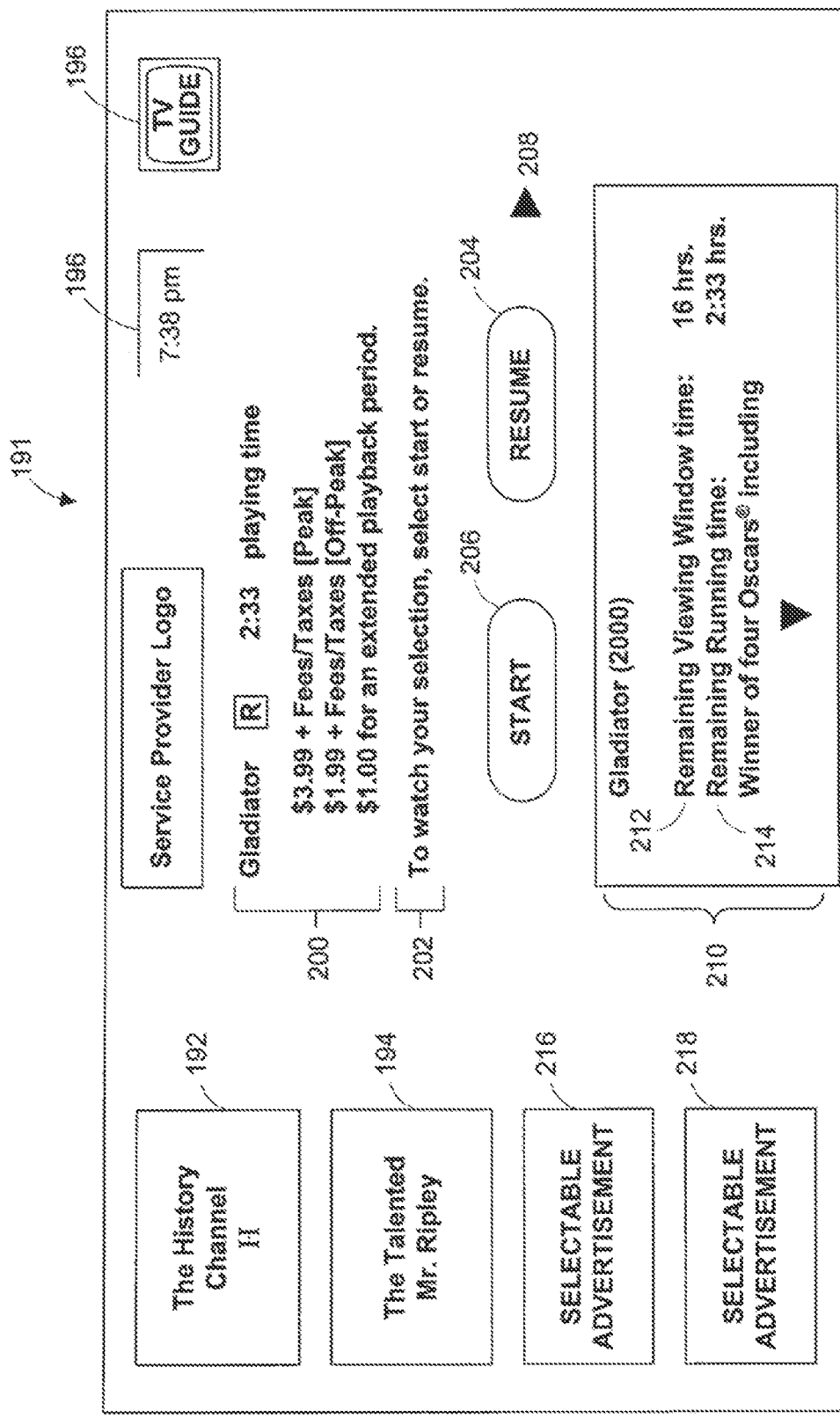
FIG. 14 illustrates a screen where a user may resume or restart the delivery of a media-on-demand item in accordance with the present invention.

FIG. 14 illustrates a display screen where a user may resume or restart the delivery of a media-on-demand item that was stopped in mid delivery or that has at least in part been recorded by the user. As shown, resume display screen 191 may include advertiser icons 192 and 194, clock 196, media information 200, options message 202, resume option 204, restart option 206, scroll arrow 208, media description 210, remaining viewing window time 212, remaining program run time 214, first interactive advertisement area 216, and second interactive targeted area 218. Clock 196 may display the current time to the user.

Media information 200 may contain the title of the media, the media rating, the run-time of the media, the cost for a variety of delivery options, or any other suitable information. Costs for both peak and off-peak delivery alternatives are shown. Alternatively, the system may provide only the current cost for resumption of the media-on-demand item or no cost.

Options message 202 may be displayed to inform a user of the option of starting delivery of selected media from a previous position, starting delivery of the media from the start position of the program or may inform the user of other options. Resume option 204 may allow a user to start delivery of the selected media from a previous position such as the last scene that was viewed by the user. Start option 206 may allow a user to start the delivery of the selected media from the beginning. Scroll arrow 208 may allow a user to select other options.

Media description 210 may contain (either individually or in any combination) the title of the media, the release date of the media, the current status of the viewing window, the current status of the playback time limit, the program running time of the media, the streaming time limit, and a description of the media item.

Remaining viewing window time 212 may indicate the amount of time remaining in the current viewing window for access to the on-demand program.

Remaining program running time 214 may indicate the running time for what remains to be presented to the user for the current on-demand program.

First interactive advertisement area 216 and second interactive advertisement area 218 may display advertising that is targeted to a user's preferences. A user may select area 216 or 218 to view more information regarding the advertised product. Selecting area 216 or 218 may allow a user to purchase the advertised product or service, or may allow a user to indicate that the user desires to purchase that product or service (e.g., purchase through the program guide).

Figure 15:
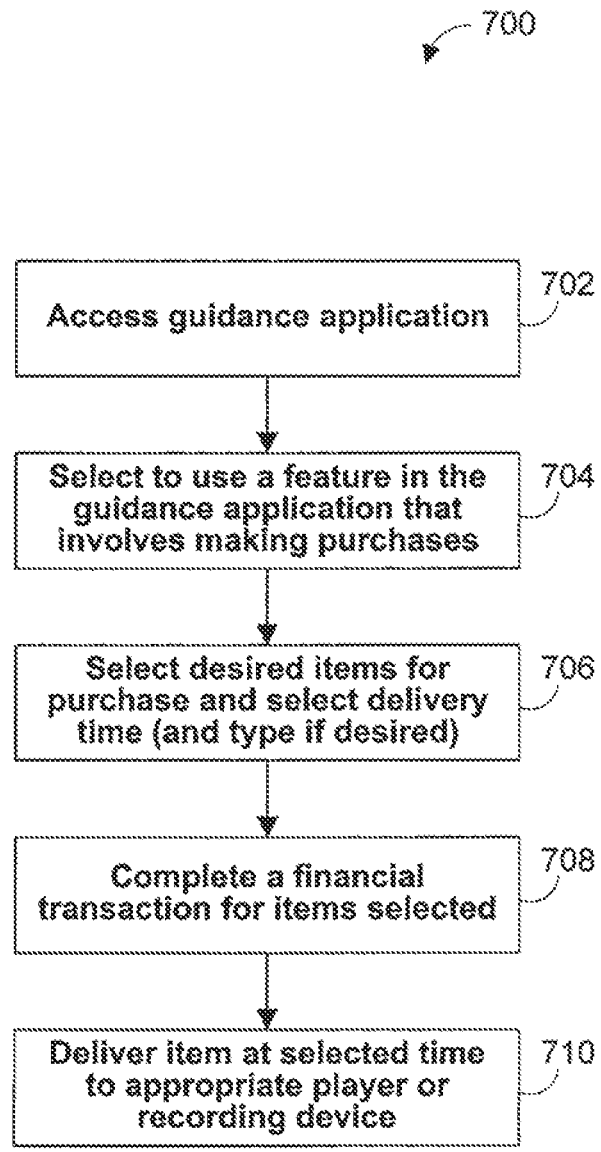
FIG. 15 illustrates a flow diagram of a process for media-on-demand ordering in accordance with the present invention.

FIG. 15 illustrates a flow diagram of illustrative process 700 for media-on-demand ordering. At step 702, a user may access a guidance application. At step 704, the user may select to use a feature in the guidance application that involves making purchases.

The guidance application may allow the user to select media items (e.g., on-demand media items) to purchase at step 706. If desired, at step 706, the user may select an item that is available for delivery on demand by the user (e.g. the user selects the time of delivery). On-demand delivery may be limited by the viewing rights that are assigned to the user for that media-on-demand item. If desired, the guidance application may allow the user to select an off-peak or peak viewing window.

Next, at step 708, the system may prepare the financial transaction for items selected. Some media items may be available to users without requiring a purchase. In such circumstances, steps such as steps 704 and 708 may not be necessary.

At step 710, the system may make the media item available for delivery to the user's equipment and/or may present the media item on the user's equipment. If the user was given the option of selecting a particular viewing window (e.g. an off-peak or peak viewing window), the system may make the media item available during the selected viewing window.

Figure 16:
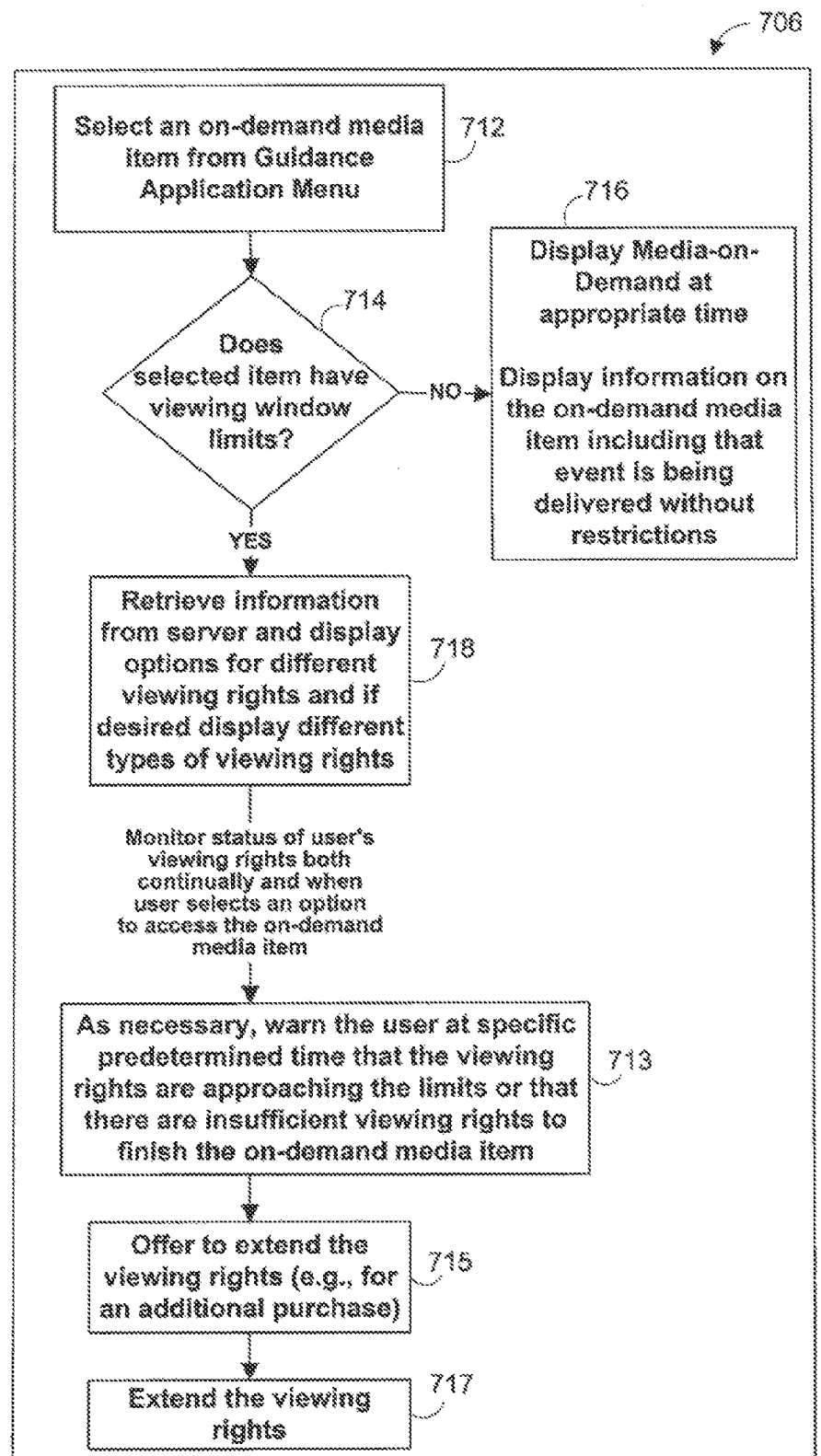
FIG. 16 illustrates a flow diagram of a process for limits on media-on-demand programs displaying media-on-demand programs in accordance with the present invention.

FIG. 16 illustrates a flow diagram for step 706 of FIG. 15 for selecting an on-demand media item (e.g., a movie) from a menu and in addition for informing the user of the viewing window limits.

At step 712, a user may select an item (e.g., an on-demand media item) from a menu of a guidance or media on-demand application. At step 714 the guidance application may determine whether viewing restrictions are associated with the selected item. If the selected item does not have viewing restrictions, information may be displayed indicating the lack of restrictions and the item may be prepared for delivery on demand to the user (step 716). If viewing restrictions are associated with the selected item, at step 718 the information may be retrieved (e.g., retrieved from a server) and displayed for the user. A user may select to access that media item with the knowledge of the viewing restrictions that are associated with that media item. For example, the user may have selected the movie Gladiator and selected to obtain video-on-demand delivery of the movie after being informed of the viewing rights for that movie (e.g., informed of the viewing window, the playback limit, etc.).

If desired, the guidance application at step 718 may also give the user options for acquiring one of a number of different viewing rights. For example, the guidance system may inform the user of different delivery costs at different times. If desired, the guidance system may give the user other options such as a peak viewing window option and an off-peak viewing window option or the option to purchase extended rights such as: viewing time, streaming time or playback time. Examples of different types of viewing rights that may be presented are: information identifying a particular viewing window, a particular streaming limit, or a particular playback limit for that option. Each one of the different viewing rights may be presented as separate options to provide the user with flexibility in selecting an appropriate viewing window, streaming limit, or playback limit.

Once a selection is made by the user with the knowledge of the viewing rights for a media item, the user may access the program for presentation to the user on the user's equipment.

The system may monitor the current status of the user's viewing rights or may determine the current status in response to user actions. At step 713, a warning may be displayed at a predetermined time (e.g., a predetermined time before sufficient viewing rights expire, a predetermined time before viewing rights expire to inform the user of the current status of viewing rights). In some circumstances, the warning may be displayed when there are insufficient viewing rights or when any of the current viewing rights of the user is approaching a point at which insufficient viewing rights will remain to finish the on-demand media item (e.g., finish an on-demand presentation, finish playback from a recorded on-demand item). If desired, the warning may include information describing the extent of the user's viewing rights and approximately how much time remains in the program. If desired, a user may be provided with an opportunity to ignore the warning. If desired, a user may be given an option to be reminded of the warning at a later time. At step 715, an option may be provided for the user to extend the viewing rights. The option may allow the user to extend the viewing window, the streaming limit, the playback limit, or combinations thereof. The viewing rights may be extended for a fee. At step 717, viewing rights for the user may be extended in response to the user selecting the option to extend viewing rights.

Figure 17:
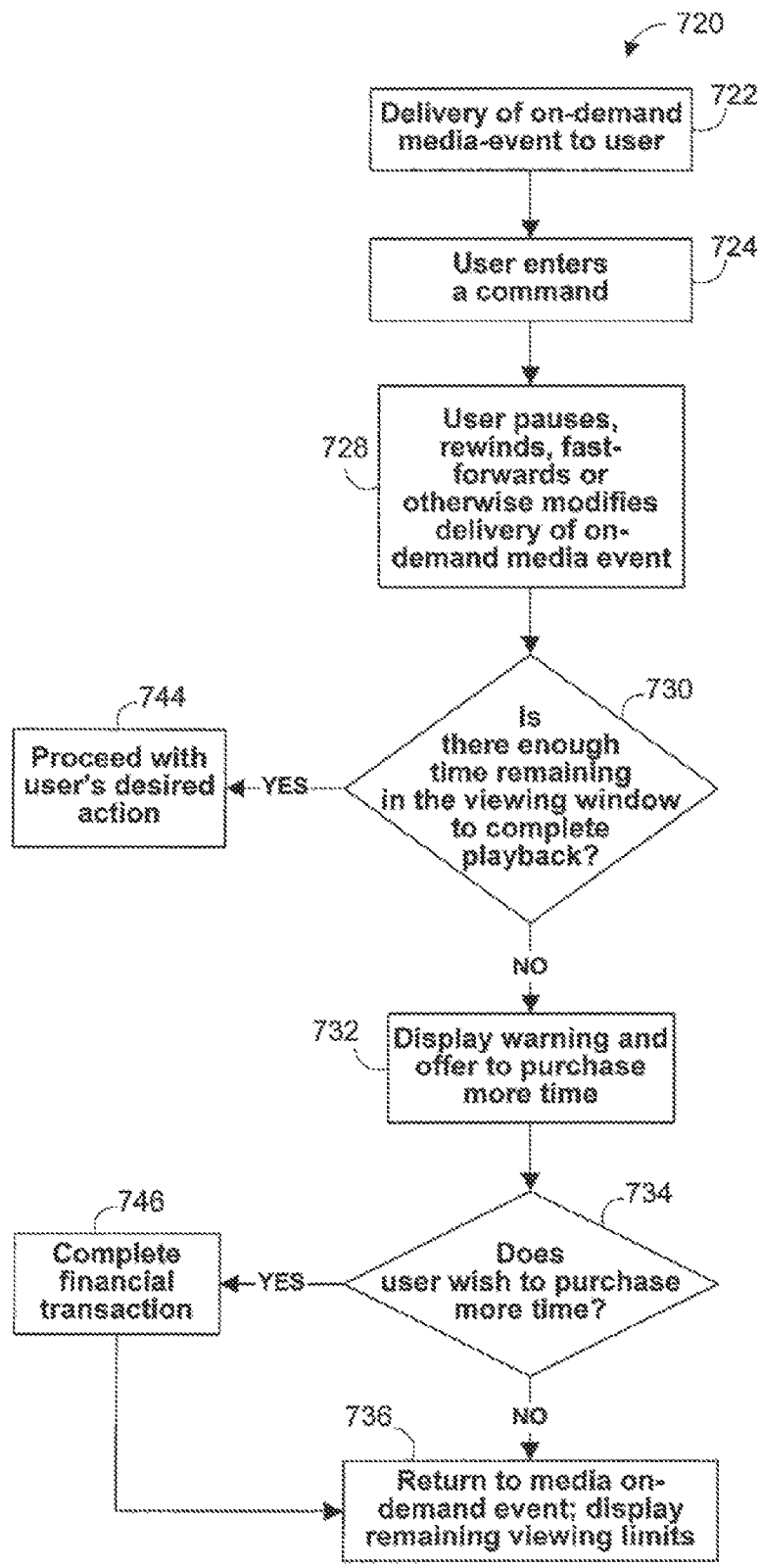
FIG. 17 illustrates a flow diagram of a process for enforcing limits on media-on-demand programs in accordance with the present invention.

FIG. 17 illustrates a flow diagram for entry and exit of a selected on-demand media event and informing the user whether based on the viewing window, the streaming time limit, the playback limit, other factor, or combinations thereof, completion of the media program will be allowed. At step 722 of FIG. 17 the media program is made accessible for on-delivered delivery.

At step 724, the user may select a command such as stop, pause, rewind, fast forward, etc. The selection may have been made for example to access the media event for the first time, to control the delivery of an already accessed media event, or to return to an accessed media event. At step 728, at a later point in time, the user may interact with the system again to stop, pause, rewind, or fast-forward the media event. At step 730, the current status of the user's viewing rights may be determine to determine whether there is sufficient time remaining (e.g., in the viewing window, playback limit, streaming time limit, etc.) to complete the presentation of the on-demand media event to the user. If there is sufficient time, the user's desired action in step 728 is performed at step 744. If there is insufficient time remaining (e.g., time remaining in the viewing window, playback limit, or streaming time limit) to finish presenting the media event completely, the guidance application, at step 732, may display a warning and offer the user the opportunity to make a purchase to extend the limits. At step 734 the guidance application may determine whether the user wishes to extend the limits. If the user decides to extend one or more of the time limits, a financial transaction may be completed at step 746 and the user may be allowed to return to the on-demand media event. If the user decides not to make a purchase to extend one or more of the time limits, the user may be allowed to return to the on-demand media event. In one or more of steps 724, 728, 744, 732, and 736, information on the current status of the viewing window, playback limit, or streaming time limit may be displayed.

The application for providing media events on demand or for managing the on-demand delivery of media events may be an application that interfaces with an interactive television program guide application to provide such features or may be a separate application that may operate with no communications or some communications with an interactive program guide application.

Thus, it is seen that systems and methods for managing media-on-demand delivery are provided according to the principles of the present invention. Persons skilled in the art will appreciate that the present invention can be practiced by other than the described embodiments, which are presented for the purposes of illustration rather than of limitation, and the present invention is limited only by the claims which follow.

What is claimed is:

1. A method for providing on-demand media, comprising:
   receiving a selection of a media event to be delivered on user demand to a user via a delivery stream;
   generating for display a plurality of viewing rights that includes a streaming time limit, wherein the streaming time limit specifies a maximum amount of time using bandwidth to stream the media event is permitted and the streaming time limit exceeds a time duration of the media event; and
   streaming the media event via the delivery stream in response to determining that a total accumulated time of using bandwidth to stream the media event does not exceed the streaming time limit.

2. The method of claim 1, further comprising generating for display an off-peak viewing window option and a peak viewing window option.

3. The method of claim 1, further comprising generating for display a warning indicating that one or more of the viewing rights are insufficient to finish streaming the media event.

4. The method of claim 3, further comprising generating for display an option to extend the one or more viewing rights.

5. The method of claim 1, further comprising generating for display a warning indicating that there is insufficient time for completing viewing of the media event within a viewing limit for the media event.

6. The method of claim 1, further comprising generating for display an option to record at least a portion of the media event using a media recording device.

7. The method of claim 6, further comprising delivering the media event to a recording device located local to the user.

8. The method of claim 6, further comprising delivering the media event to a recording device located remotely from the user.

9. The method of claim 6, further comprising limiting playback of the media event from the media recording device based on one or more of the viewing rights.

10. The method of claim 6, wherein the generating for display an option to record comprises generating for display a playback time limit for the media event.

11. The method of claim 6, further comprising generating for display a warning indicating that one or more of the viewing rights are insufficient to finish playback of a recorded version of the media event.

12. The method of claim 11, further comprising extending the one or more viewing rights.

13. The method of claim 6, further comprising generating for display a warning indicating that there is insufficient time for playing back a recorded version of the media event within a playback time limit for the recorded version of the media event.

14. The method of claim 1, wherein the plurality of viewing rights includes a plurality of viewing windows for on-demand delivery of the media event.

15. The method of claim 14, further comprising generating for display how much time remains in a current viewing window.

16. The method of claim 15, further comprising generating for display an additional option to extend the current viewing window.

17. The method of claim 1, further comprising generating for display how much time remains in the streaming time limit for the media event.

18. The method of claim 1, further comprising generating for display an option to extend the streaming time limit.

19. A system for providing on-demand media, the system comprising a user equipment configured to:
   receive a selection of a media event to be delivered on user demand to a user via a delivery stream; and
   generate for display a plurality of viewing rights that includes a streaming time limit, wherein the streaming time limit specifies a maximum amount of time using bandwidth to stream the media event is permitted and the streaming time limit exceeds a time duration of the media event; and
   stream the media event via the delivery stream in response to determining that a total accumulated time of using bandwidth to stream the media event does not exceed the streaming time limit.

20. The system of claim 19, wherein the user equipment is configured to generate for display an off-peak viewing window option and a peak viewing window option.

* * * * *